(12) United States Patent
Smith et al.

(10) Patent No.: US 8,300,057 B2
(45) Date of Patent: Oct. 30, 2012

(54) DATA PROCESSING HARDWARE

(75) Inventors: Euan Christopher Smith, Cambridgeshire (GB); Nicholas Lawrence, Cambridgeshire (GB)

(73) Assignee: Cambridge Display Technology Limited (GB)

(*) Notice: Subject to any disclaimer, the term of this patent is extended or adjusted under 35 U.S.C. 154(b) by 858 days.

(21) Appl. No.: 12/225,449

(22) PCT Filed: Mar. 21, 2007

(86) PCT No.: PCT/GB2007/050141
§ 371 (c)(1),
(2), (4) Date: Jan. 23, 2009

(87) PCT Pub. No.: WO2007/107795
PCT Pub. Date: Sep. 27, 2007

(65) Prior Publication Data
US 2009/0128571 A1    May 21, 2009

(30) Foreign Application Priority Data

Mar. 23, 2006    (GB) .................................. 0605748.3

(51) Int. Cl.
*G06F 13/00* (2006.01)
*G06F 7/60* (2006.01)
*G06F 17/10* (2006.01)
*G09G 3/30* (2006.01)

(52) U.S. Cl. ............................... 345/536; 703/2; 345/76

(58) Field of Classification Search ........................ None
See application file for complete search history.

(56) References Cited

U.S. PATENT DOCUMENTS

| | | |
|---|---|---|
| 4,539,507 A | 9/1985 | VanSlyke et al. |
| 4,739,474 A | 4/1988 | Holstynski |
| 5,692,210 A | 11/1997 | Mita et al. |
| 5,960,211 A | 9/1999 | Schwartz et al. |
| 2002/0186311 A1 | 12/2002 | Sevat et al. |
| 2004/0249615 A1* | 12/2004 | Grzeszczuk et al. ............ 703/2 |

(Continued)

FOREIGN PATENT DOCUMENTS
EP    0293700 A2    12/1988
(Continued)

OTHER PUBLICATIONS

Liu Wet Al, "Existing and new algorithms for Non-Negative Matrix Factorization", Final Report CS 383C Poject, Department of Computer Science, University of Texas, Austin, [Onliine] Aug. 26, 2004, <http://web.archive.org/web/20040826233249/www.cs.utexas.edu/users/liuwg/383CProject/final_report.pdf>.*

(Continued)

*Primary Examiner* — David T Welch
*Assistant Examiner* — Matthew D Salvucci
(74) *Attorney, Agent, or Firm* — Schwegman Lundberg & Woessner, P.A.

(57) ABSTRACT

Embodiments include a hardware accelerator for non-negative matrix factorization (NMF), in particular for driving an OLED display. The hardware accelerator determines a oair of factor matrices (R;C) which when multiplied together approximate a target matrix. Each factor matrix R, C has multiple data buses each associated with a respective block of memory and there is a matrix of processor blocks and an associated memory block storing a portion of a matrix (Q) representing a difference between a product of the pair of factor matrices and the target matrix. Control circuitry controls the reading and writing of data between the various elements to perform the matrix factorisation.

19 Claims, 20 Drawing Sheets

U.S. PATENT DOCUMENTS

2004/0268080 A1    12/2004    Ohba
2005/0179623 A1*    8/2005    Negoi .............................. 345/76

FOREIGN PATENT DOCUMENTS

WO    WO-2006/035246 A1    4/2006
WO    WO-2006/067520 A2    6/2006

OTHER PUBLICATIONS

"Great Britain Application Serial No. GB0605748.3, Examination Report mailed May 4, 2010", 6 pgs.

"International Application Serial No. PCT/GB2007/050141, International Search Report mailed Feb. 29, 2008", 3 pgs.

"International Application Serial No. PCT/GB2007/050141, Written Opinion mailed Feb. 29, 2008", 10 pgs.

Aleksandrov, L., et al., "Methods for implementing linear algebra algorithms on high performance architectures", [online]. [retrieved May 11, 2007]. Retrieved from the Internet: <URL: http://public.1an1.gov/djidjev/papers/matrix.ps>, (1997), 28 pgs.

Brent, R. P., et al., "Computation of the singular value decomposition using mesh-connected processors", *Technical Report TR 82-528*, Department of Computer Science, Cornell University [online]. [retrieved Feb. 15, 2008]. Retrieved from the Internet: <URL: http://ecommons.library.cornell.edu/bitstream/1813/6367/1/82-528.pdf>, (Mar. 1983), 35 pgs.

Liu, W., et al., "Existing and new algorithms for non-negative matrix factorization", *Final Report CS 383C Project*, Department of Computer Science, University of Texas, Austin, TX [online]. [retrieved Feb. 6, 2008]. Retrieved from the Internet: <URL: http://web.archive.org/web/20040826233249/www.cs.utexas.edu/users/liuwg/383CProject/final_report.pdf, (2004), 18 pgs.

Mead, C., et al., "8.3 Algorithms for VLSI Processors Arrays", *Introduction to VLSI Systems, XX*, Addison-Wesley Publishing Company, Inc., (1980), 271-292.

Robila, S. A., et al., "A parallel unmixing algorithm for hyperspectral images", *Intelligent Robots and Computer Vision XXIV: Algorithms, Techniques, and Active Vision, Proceedings of SPIE*, vol. 6384, (Oct. 2, 2006),11 pgs.

Smith, E. C., "8.3: Total Matrix Addressing (TMA tm)", *International Symposium Digest of Technical Papers (SID 2007)*, (2007), 93-96.

Brent, R. P., et al., "Computation of the Singular Value Decomposition Using Mesh-Connected Processors", *Journal of VLSI and Computer Systems*, 1(3), (1984), 242-270.

\* cited by examiner

DATA PROCESSING HARDWARE

RELATED APPLICATIONS

This application is a nationalization under 35 U.S.C. 371 of PCT/GB2007/050141, filed Mar. 21, 2007 and published as WO 2007/107795 A2, on Sep. 27, 2007, which claimed priority under 35 U.S.C. 119 to United Kingdom Patent Application Serial No. 06057478.3, filed Mar. 23, 2006; which applications and publication are incorporated herein by reference and made a part.

This invention generally relates to data processing hardware, and more particularly to hardware accelerators and related methods for matrix factorisation especially non-negative matrix factorisation (NMF). Embodiments of the invention are particularly useful for driving electroluminescent displays such as OLED (organic light emitting diode) displays.

We have previously described how techniques for non-negative matrix factorisation may be advantageously employed in OLED display driving (see in particular our International application PCT/GB2005/050219, hereby incorporated by reference in its entirety). We now describe embodiments of hardware for implementing these techniques which in particular address the problem of performing the very large number of calculations required sufficiently fast to generate a real time display. We will describe preferred embodiments with reference to display driving but the skilled person will appreciate that the hardware and methods we describe may be employed for fast factorisation of substantially any type of data including, but not limited to, image data (for example, for face recognition), computer network data (for example, user activity data for security monitoring), multivariant data stored in a database (for example, for data mining), sensor data (for example, for determining a set of component spectra which make up an overall combined spectrum), biological sequence data and/or microarray data (for example, for sequence analysis), object descriptor data (for example, for machine learning/recognition techniques), and search result data (for analysis and/or pattern recognition). Further details of these and other applications may be found in the applicant's previous International patent application (ibid). Background prior art can be found in U.S. Pat. No. 5,692,210; U.S. Pat. No. 4,739,474; US2002/0186311; U.S. Pat. No. 5,690,211: EP 0293700 and US 2004/0268080.

To aid in understanding embodiments of the invention we will first review multi-line addressing (MLA) techniques, a preferred special case of which comprises total matrix addressing (TMA) techniques. These are preferably employed with passive matrix OLED displays, that is displays which do not include a memory element for each pixel (or colour sub-pixel) and must therefore be continually refreshed. In this specification OLED displays include displays fabricated using polymers, so-called small molecules (for example U.S. Pat. No. 4,539,507), dendrimers, and organometallic materials; the displays may be either monochrome or colour.

In a conventional passive matrix display the display is driven line-by-line and hence a high drive is required for each line because it is only illuminated for a fraction of the frame period. MLA techniques drive more than one line at once and in TMA techniques all the lines are driven simultaneously and an image is built up from a plurality of successively displayed subframes which, when integrated in the observer's eye, give the impression of the desired image. The problem is to determine sets of row and column drive signals for the subframes so that a set of subframes approximates the desired image. We have previously described solutions to this problem in International Patent Applications Nos. GB2005/050167-9 (all three of which applications are hereby incorporated by reference in their entirety). A preferred technique employs non-negative matrix factorisation of a matrix describing the desired image. The factor matrices, the elements of which are positive since the OLED display elements provide a positive (or zero) light emission, essentially define the row and column drive signals for the subframes. We describe below one preferred NMF technique, although others may be employed. We will further describe details of a hardware accelerator suitable for implementing this, and other NMF procedures.

To assist in understanding the invention, referring to FIG. 1a we will first describe an overall OLED display system 100 which incorporates a display drive data processor 150 which may be implemented using embodiments of the invention to perform TMA.

In FIG. 1a a passive matrix OLED display 120 has row electrodes 124 driven by row driver circuits 112 and column electrodes 128 driven by column drives 110. Details of these row and column drivers are shown in FIG. 1b. Column drivers 110 have a column data input 109 for setting the current drive to one or more of the column electrodes; similarly row drivers 112 have a row data input 111 for setting the current drive ratio to two or more of the rows. Preferably inputs 109 and 111 are digital inputs for ease of interfacing; preferably column data input 109 sets the current drives for all the U columns of display 120.

Data for display is provided on a data and control bus 102, which may be either serial or parallel. Bus 102 provides an input to a frame store memory 103 which stores luminance data for each pixel of the display or, in a colour display, luminance information for each sub-pixel (which may be encoded as separate RGB colour signals or as luminance and chrominance signals or in some other way). The data stored in frame memory 103 determines a desired apparent brightness for each pixel (or sub-pixel) for the display, and this information may be read out by means of a second, read bus 105 by display drive data processor 150. Display drive data processor 150 preferably performs input data pre-processing, NMF, and post-processing, as described further later.

FIG. 1b illustrates row and column drivers suitable for driving a display with a factorised image matrix. The column drivers 110 comprise a set of adjustable substantially constant current sources which are ganged together and provided with a variable reference current $I_{ref}$ for setting the current into each of the column electrodes. This reference current is pulse width modulated by a different value for each column derived from a row of an NMF factor matrix. The row driver 112 comprises a programmable current mirror, preferably with one output for each row of the display (or for each row of a block of simultaneously driven rows). The row drive signals are derived from a column of an NMF factor matrix and row driver 112 distributes the total column current for each row so that the currents for the rows are in a ratio set by the ratio control input (R). Further details of suitable drivers can be found in the Applicant's PCT application GB2005/010168 (hereby incorporated by reference).

OLEDs have a quadratic current-voltage dependence, which constrains independent control of the row and column drive variables. PWM is useful as it allows the column and row drive variables to be decoupled from one another. Further, with the above described drive arrangement, because current is shared between rows, if the current in one row increases the current in the rest reduces. Preferably therefore the reference current and sub-frame time are scaled to compensate. For example, the sub-frame times can be adjusted with the aim of having the peak pixel brightness in each subframe equal (also reducing worst-case/peak-brightness aging). In practice this is limited by the shortest selectable sub-frame time and also by the maximum column drive current, but since the adjustment is a second order optimisation this need not be a problem.

One example of a preferred NMF calculation is given below.

An input image is given by matrix V with elements $V_{xy}$, R denotes a current row matrix, C a current column matrix, Q a remaining error between V and R.C, p the number of subframes, average an average value, and gamma an optional gamma correction function.

The variables are initialised as follows:

$$av = \text{average}(\text{gamma}(V_{xy}))$$

$$\text{initial}RC = \sqrt{(av/p)}$$

$$Q_{xy} = \text{gamma}(V_{xy}) - av$$

An embodiment of the NMF system then performs the following calculation for p=1 to the total number of subframes:

--- start
$Q_{xy} = Q_{xy} + R_{py}C_{xp}$ for each x and y $$R_{py} = \frac{\text{bias} + \sum_x Q_{xy}C_{xp}}{\text{bias} + \sum_x C_{xp}C_{xp}} \text{ for each } y$$

$$C_{xp} = \frac{\text{bias} + \sum_y Q_{xy}R_{py}}{\text{bias} + \sum_y R_{py}R_{py}} \text{ for each } x$$

$Q_{xy} = Q_{xy} - R_{py}C_{xp}$ for each x and y
loop to start (p ← p + 1)

---

The variable bias prevents division by zero, and the values of R and C pull towards this value. A value for bias may be determined by initialRC×weight×no.of.columns where the number of columns is x and the weight is, for example, between 64 and 128.

Broadly speaking the above calculation can be characterised as a least squares fit. The matrix Q initially begins as a form of target matrix since the row R and column C matrices are generally initialised so that all their elements are the same and equal to the average value initialRC. However from then on matrix Q represents a residual difference between the image and the result of combining the subframes—so ideally Q=0. Thus, broadly speaking, the procedure begins by adding the contribution for subframe p and then for each row finds the best column values, and afterwards for each column finds the best row values. The updated row and column values are then subtracted back from Q and the procedure continues with the next subframe. Typically a number of iterations, for example between 1 and 100, is performed so that the R and C for a set of subframes converge towards a best fit. The number of subframes p employed is an empirical choice but may, for example, be between 1 and 1000.

In this description the skilled person will understand that references to rows and columns are interchangeable and that, for example, in the above equation system the order of processing to determine updated $R_{py}$ and $C_{xp}$ values may be exchanged.

In the above set of equations preferably all integer arithmetic is employed, and preferably R and C values comprise 8 bit values and Q comprises signed 16 bit values. Then, although the determination of R and C values may involve rounding off there is no round-off error in Q since Q is updated with the rounded off values (and the product of R and C values cannot be greater than maximum value which can be accommodated within Q). The above procedure may straightforwardly be applied to pixels of a colour display (details later). Optionally a weight W matrix may be employed to weight errors in low luminance values higher, because the eye is disproportionately sensitive to imperfect blacks. A similar weighting may be applied to increase the weight of errors in a green colour channel, because the eye is disproportionately sensitive to green errors.

A typical set of parameters for a practical implementation of a display driver system based upon the above NMF procedure might have a desired frame rate of 25 frames per second, each frame comprising 20 iterations of the procedure, with, for example, 160 subframes. A serial implementation of the above procedure running at 150 MHz using 20 iterations and 160 subframes would result in a frame rate of 0.25 fps. There is therefore a need for improved techniques to facilitate the achievement of typical video frame rates without the need for a very fast, expensive and power hungry digital signal processor.

According to the present invention there is therefore provided a matrix factorisation hardware accelerator for determining a pair of factor matrices (R;C) which when multiplied together approximate a target matrix, the hardware accelerator comprising: an input to receive an input data matrix representing said target matrix; a first factor matrix memory for storing row and column data for a first factor matrix (R), said first factor matrix memory having a plurality of first data buses each associated with a respective block of said first factor matrix memory for accessing first factor matrix column data stored in the block; a second factor matrix memory for storing row and column data for a second factor matrix (C), said second factor matrix memory having a plurality of second data buses each associated with a respective block of said second factor matrix memory for accessing second factor matrix row data stored in the block; a matrix of processor blocks, each processor block having a first processor block data bus coupled to one of said first data buses, a second processor block data bus coupled to one of said second data buses, and a result data output; a processor memory block for storing a portion of a matrix (Q) representing a difference between a product of said pair of factor matrices and said target matrix; and a data processor comprising at least one multiply-add unit, said data processor having a first input coupled to said processor memory block and a second input coupled to one or both of said first and second processor block data buses and having an output coupled to said result data output; and control circuitry to control writing of data from said input into said processor memory blocks of said matrix of processor blocks, to control reading of data from said first and second factor matrix memories for provision to said matrix of processor blocks, and to control writing of data derived from said result data outputs back to said first and second factor matrix memories to perform said matrix factorisation.

Embodiments of the above described hardware accelerator can be employed to implement a range of matrix factorisation techniques, and are particularly suitable for non-negative matrix factorisation (NMF). This may be implemented using our particular technique, described in the introduction, or other NMF methods may be implemented using the hardware. However applications of the hardware accelerator are not limited to NMF and, in particular, include a wide range of iterative techniques in which data in the first and second factor matrices is modified in a cyclic or iterative manner. The processor blocks in such applications may then be employed to perform repeated, iterative or cyclic calculations. To implement a method which does not include a non-negativity constraint signed data may be manipulated, for example by making provision for a sign bit in the data storage and/or processing.

Broadly speaking in embodiments by distributing the processing, and also storage of the residuals matrix Q a plurality of partial calculations may be performed by each processor block in parallel. Such an arrangement is convenient for implementation in hardware such as an FPGA (field programmable gate array) and because the processor blocks, more particularly the processor memory blocks storing portions of Q can be distributed over the area of an image, the speed of processing can be substantially independent of image size or resolution. Moreover in embodiments the above described data structure enables a pair-wise evaluation of NMF equations, first substantially simultaneously updating Q to determine a target for subframe p and, at the same time, updating one of R and C, and then updating the other of C and R and at substantially the same time subtracting the updated subframe from Q (albeit with a latency, needed to calculate the first C (or R value before beginning to subtract the subframe from Q). In preferred embodiments, therefore, the data processor includes a pair of digital signal processors (multiply-add units), one for evaluating each of two equations simultaneously, in the above example an equation for updating Q and an equation for updating R (or C). (In other embodiments, however, a single DSP unit may be multiplexed to achieve some benefit, albeit with a reduced parallelism).

Preferably, to take account of the aforementioned latency, the portion of Q stored in a processor block is double-buffered so that an "old" version of Q can be used to update say C, whilst the updated value of, say C, can be used to update Q. As previously mentioned the residuals matrix Q effectively begins as the target matrix but is then modified as R and C progressively better approximate the desired target to reduce the residuals. In embodiments the residuals matrix Q itself is not needed—it merely serves to calculate the first and second factor matrices R and C and hence there does not need to be any provision for reading the portion of Q stored in a processor block, except internally within the block (no external read access to Q need be provided by the hardware accelerator). The input data matrix may be pre-processed to generate the target matrix, for example by applying a gamma correction as indicated in the introduction. Likewise the data in the first and second factor matrices may be post-processed, either by the hardware accelerator or externally. In embodiments readout from the hardware accelerator may be provided by read access to the first and second factor matrix memory. Write access to the memory may also be provided, for example for initialising the first and second factor matrices, or initialisation may be performed internally by the hardware accelerator. As previously mentioned, the calculation of a value for R or C is preferably performed within a processor block, using integer arithmetic, and as a result a value for an element of R or C may be rounded up or down or otherwise truncated or approximated. Preferably, therefore, a processor block updates an element of Q using the rounded values. Preferably, therefore the processor memory block uses variables of twice the data width (bit length) than the input to the data processor.

In some preferred embodiments the hardware accelerator control circuitry is distributed between global control circuitry for the hardware accelerator, memory control circuitry for controlling (in particular addressing) the first and second factor matrix memories, and processor block control circuitry, for local control of a processor block. However, as described further below, in some preferred embodiments only one processor block incorporates such control circuitry, for example, for addressing the memory block storing a portion of the residuals matrix Q; this may then be termed a master processor block and one or more (preferably all) of the other processor blocks may then be slaved to this master, employing timing and control signals derived from the master processor block.

In some preferred embodiments the memory control circuitry controls sequential selection of each element of one or other or both of the factor matrices, of a set of elements processed by a processor block. In other words, a row of processor blocks may each process a block of column values of the row factor matrix (portions of a/each column being signed to successive rows of processor blocks). Then each of the set of column values in turn processed by a row of processor blocks may be selected and provided to the processor blocks for processing. Rows of data in the column factor matrix may be treated correspondingly by columns of processor blocks. The memory control circuitry may thus be configured to provide elements of the first and second factor matrices to the processing blocks in sequence for processing according to NMF calculation equations, for example as described above. The memory control circuitry may also control external read and/or write access to the factor matrix memory.

In preferred embodiments of the hardware accelerator the processor blocks are daisy-chained using third processor block data buses, for writing the residuals matrix Q into the distributed memory array (although in variants this could be done, for example, using the row and column matrix memory data buses). Preferably they are also daisy-chained by providing a pair of result data inputs and a pair of result data outputs, which may conveniently be viewed as north, south, east and west connections, to allow results to be passed from processor block to processor block within the matrix to a row edge and/or a column edge of the matrix of processor blocks (under control of the control circuitry). Trailing inputs opposite the edges to which the data is passed may be tied to zero. Preferably the result data is received by math blocks for the row and column results. These math blocks preferably accumulate partial result data received from each processor block in the relevant row or column of blocks. Further, since in embodiments a division is required to update the row and column factor matrix values (see above equations) the math blocks may be configured to perform this division. However, since, in a given subframe, the denominator of the row and column matrix update equations is always the same this division need only be performed once. Thus a plurality of row and column blocks may be provided, for example one for each row and column of processor blocks and, in such a configuration, one of the math blocks may be designated a master block and the others slave math blocks. The master block may then include a divider to calculate a reciprocal of the relevant denominator, and the slave math blocks then need only include multipliers to multiply by this reciprocal value received from the master (row or column) math block. Preferably the row and column matrix memories are implemented using dual-ported memory to allow simultaneous read and write access by the processor blocks and math blocks.

In some preferred embodiments a processor block comprises first and second multiply-add units. In this way one of these may be employed to calculate the product R.C and the other may be employed to accumulate the product Q.C, these two operations taking place in parallel. Since the product Q.C is determined after R.C. has been added to Q, the output of one of these multiply-add units is preferably coupled to the input of the second unit. The same structure may be used to accumulate the product Q.R and to then update the residuals matrix Q by subtracting the product R.C again in parallel (once the latency in calculating the first element of C is taken into account). In order to perform both these calculations, preferably an input to one of the multiply-add units can be switched between R and C, for example using a multiplexer. Furthermore in some preferred implementations one of the multiply-add units may also be employed to determine the products C.C and R.R. Preferably, to implement this, both inputs of one of the multiply-add units may be selectively coupled to either C or R, for example by a pair of multiplexers. Further since preferred embodiments of the NMF procedure involve modifying Q at the start and end of the loop, preferably one of the multiply-add units has an add unit with an input coupled to an output of the Q block memory, an output of this multiply-add unit providing a write input to the Q block memory (which is dual-ported).

The sequencing of the calculations and selection of either R or C by the multiplexers may be controlled by a state machine within a processor block; this may also be used to address the Q block memory. However since all the processor blocks are performing substantially the same calculations at substantially the same time (albeit using different portions of the residuals matrix Q, and corresponding different portions of the row and column factor matrices R and C) only one of the processor blocks, the "master" processor block need incorporate such control circuitry. The other processor blocks may then be considered as "slave" processor blocks, taking their timing and control signals from the master processor block. In some preferred embodiments the state machine controls the multiplexers and multiply-add units to first calculate the denominator equation value (C.C; R.R) before calculating the other values (in particular Q.C; Q.R).

Returning the overall architecture of the hardware accelerator, as mentioned above data in the row matrix is divided into a set of blocks, for example 8 blocks for 160 rows (for a 160 line display; coincidentally in this example the same number of lines as subframes). Likewise the column matrix is divided into a number of blocks, for example 10 blocks or a 360 column display. Thus each processor block processes a set of row and column data, in the aforementioned example data for 20 rows and 36 columns. A row data bus is provided for each block of rows, and this provides data for the block of rows to the set of processor blocks (one for each column block) processing this row data. Likewise each column block has an associated column data bus providing data for the block of columns to the corresponding processor blocks (one for each row block) processing the column data for the block. In the embodiments described later a row data bus for a row block and a column data bus for a column block carries a single row (or column) value, for example an 8 bit value, at any one time. In this case a processor block receives a single row value and a single column value at any one time or processing. The processor block state machine is coupled to the row and column block memory control circuitry to control the provision of row and column values from respective row matrix and column matrix blocks one at a time before processing, and after a complete block has been processed the result data (which is preferably latched within a processor block) is passed back along the relevant chain of row or column processor blocks to the math blocks for accumulation and updating of the row and column factor matrices. Again, as previously mentioned, because in preferred embodiments a processor block has four result data connections, two inputs and two outputs, forming a rectangular matrix, result data for the row and columns may be passed simultaneously through the matrix of processor blocks, in the examples described later in a northerly direction (for the columns) and a westerly direction (for the rows). The skilled person will appreciate, however, that in other embodiments wider row and/or column block data buses may be employed, for example to provide two or more row and/or column matrix values to a processor block simultaneously. This increases a rate of data processing although preferably, in order to take advantage of these wider data buses, more multiply-add units are provided. For example, to process two pairs of row and column data values simultaneously, preferably two pairs of multiply-add units are provided. In the general case, preferably at least one pair of multiply-add units is provided for each pair of row and column data elements processed simultaneously by a processor block. Potentially all the row and column data items of a respective row and column data block may be processed simultaneously by a processor block, for increased speed at the expense of increased silicon area.

The invention further provides a driver for an electro-optic display, more particularly an emissive display such as an OLED display, incorporating an NMF hardware accelerator as described above. Examples of emissive displays which may be employed with such a driver include a passive matrix OLED display, an inorganic LED display, a plasma display, a vacuum fluorescent display, and thick and thin film electroluminescent displays as iFire® displays.

In some preferred embodiments the hardware accelerator is specifically configured for performing the calculations in the presently preferred NMF procedure described above. Thus in a related aspect the invention provides a method of hardware accelerating a non-negative matrix factorisation (NMF) calculation, the calculation comprising iteratively determining:

$$Q_{xy} = Q_{xy} + R_{py}C_{xp} \text{ for each } x \text{ and } y \quad (1)$$

$$R_{py} = \frac{\text{bias} + \sum_{x} Q_{xy}C_{xp}W_{xyp}}{\text{bias} + \sum_{x} C_{xp}C_{xp}W_{xyp}} \text{ for each } y \quad (2)$$

$$C_{xp} = \frac{\text{bias} + \sum_{y} Q_{xy}R_{py}W_{xyp}}{\text{bias} + \sum_{y} R_{py}R_{py}W_{xpy}} \text{ for each } x \quad (3)$$

$$Q_{xy} = Q_{xy} - R_{py}C_{xp} \text{ for each } x \text{ and } y \quad (4)$$

where equations (1) to (4) are evaluated for each value of p each iteration, and where $W_{xyp}$ comprises a weighting factor, the method comprising, for each p: storing Q in a plurality of memory blocks distributed across a corresponding plurality of processor blocks; evaluating the denominator of equation (2); evaluating contributions to the numerator of equation (2) and equation (1) substantially simultaneously across said plurality of processor blocks to determine $Q_{xy}$ and $R_{py}$; evaluating the denominator of equation (3); and evaluating contributions to the numerator of equation (3) and equation (4) substantially simultaneously across said plurality of processor blocks to determine $C_{xp}$ and $Q_{xy}$.

In embodiments the variable bias may be zero, in which case provision for this variable may be omitted. The weighting factor $W_{xyp}$ may be a scalar, vector or matrix, depending upon the implementation, or $W_{xyp}$ may be omitted (in which case it is given a value of unity).

Broadly speaking equations (1) and (2) are evaluated in parallel, distributed across the plurality of processor blocks, afterwards combining the partial results from these processor blocks. Likewise equations (3) and (4) are preferably evaluated substantially in parallel, in a similar manner.

In a further aspect the invention provides a system for hardware accelerating a non-negative matrix factorisation (NMF) calculation, the calculation comprising iteratively determining:

$$Q_{xy} = Q_{xy} + R_{py}C_{xp} \text{ for each } x \text{ and } y \quad (1)$$

$$R_{py} = \frac{\text{bias} + \sum_x Q_{xy}C_{xp}W_{xyp}}{\text{bias} + \sum_x C_{xp}C_{xp}W_{xyp}} \text{ for each } y \quad (2)$$

$$C_{xp} = \frac{\text{bias} + \sum_y Q_{xy}R_{xp}W_{xyp}}{\text{bias} + \sum_y R_{py}R_{py}W_{xyp}} \text{ for each } x \quad (3)$$

$$Q_{xy} = Q_{xy} - R_{py}C_{xp} \text{ for each } x \text{ and } y \quad (4)$$

where equations (1) to (4) are evaluated for each value of p each iteration, and where $W_{xyp}$ comprises a weighting factor, the system comprising: means for storing Q in a plurality of memory blocks distributed across a corresponding plurality of processor blocks; means for evaluating the denominator of equation (2); means for evaluating contributions to the numerator of equation (2) and equation (1); means for evaluating the denominator of equation (3); and means for evaluating contributions to the numerator of equation (3) and equation (4) substantially simultaneously across said plurality of processor blocks to determine $C_{xp}$ and $Q_{xy}$.

Again, the variable bias may be zero, and the weighting factor $W_{xyp}$ may be a scalar, vector, matrix or unity.

In a still further aspect the invention provides a non-negative matrix factorisation (NMF) hardware accelerator for factorising an input matrix (Q) into a pair of first and second factor matrices (R; C) the hardware accelerator comprising: a first memory store for storing elements of elements of said first factor matrix (R); a second memory store for storing elements of said second factor matrix (C); a grid of processors, coupled to said first and second memory stores to perform a plurality of (NMF) operations in parallel; and a controller to control writing of said input matrix (Q) into said grid of processors and to control said processors to write elements of said first and second factor matrices into said respective first and second memory stores.

The above described hardware may be implemented, for example, on an FPGA (field programmable gate array) or in an ASIC (application specific integrated circuit) or in custom silicon. Thus the invention further provides a carrier (for example a disk such as a CD-ROM or an optical or electrical signal carrier) carrying processor control code describing such hardware. Typically hardware of this nature is described using code such as RTL (register transfer level code) or, at a higher level, for example using a language such as SystemC.

In some embodiments the hardware accelerator is implemented on a single integrated circuit. The first and second factor matrix memory may be either on-chip or off-chip.

Thus in a further aspect the invention provides an integrated circuit (IC) for matrix factorisation, the IC comprising: an input to receive an input data matrix representing a target matrix for factorisation into first and second factor matrices (R; C); a plurality of first data buses each for accessing stored data in a block of first factor matrix memory (R); a plurality of second data buses each for accessing stored data in a block of second factor matrix memory (C); and a matrix of processor blocks, each processor block having: a first processor block data bus coupled to one of said first data buses, a second processor block data bus coupled to one of said second data buses, and a result data output; a processor memory block for storing a portion of a matrix (Q) representing a difference between a product of said pair of factor matrices and said target matrix; and a data processor comprising at least one multiply-add unit, said data processor having a first input coupled to said processor memory block and a second input coupled to one or both of said first and second processor block data buses and having an output coupled to said result data output.

In embodiments each IC provides an array of processor blocks, and the ICs may be stacked or connected in a grid formation to provide a scalable hardware implementation. Any or all of the features from the previously mentioned aspects of the invention may also be provided on-chip including, for example, features of a processor block and/or of their interconnections as described above. In particular the IC may include circuitry to enable one of the processor blocks to act as a master for the others, to provide timing and control signals. Preferably, however, this feature is able to be disabled externally, for example by a signal. This is because in a grid of processors only one need function as a master—thus the timing and control signals are also preferably made available on an external connection to the IC, to enable one IC to control one or more others.

In a related aspect the invention provides an integrated circuit (IC) for non-negative matrix factorisation (NMF) to factorising an input matrix (Q) into a pair of first and second factor matrices (R; C), the IC comprising a grid of processors coupled to external buses for accessing first and second memory stores storing elements of said first and second factor matrices (R; C) respectively.

Preferably the processors each include local memory, and comprise a plurality of slave processors and a master processor, the master processor being configured to control, in said slave processors, one or both of an address of the local memory and data processing operations of the slave processors.

In embodiments each processor of the grid is configured to process a corresponding portion of said input matrix such that a region of said input matrix may be is processed. Then, preferably the ICs have external buses which allow a plurality of the integrated circuits to be connected to process a plurality of said input matrix regions. For example, the grid may be a rectangular grid and an integrated circuit may have north, south, east and west data connections.

Where the factor matrix memory is off-chip, preferably two sets of (fast) on-chip memory are provided, one for each of the first and second (row and column) factor matrix memories. Each set preferably comprises an input buffer (for reading data), an output buffer (for writing data), and a cache (for working data).

These and other aspects of the invention will now be further described, by way of example only, with reference to the accompanying figures in which:

FIGS. 4a to 4c show, respectively, a hardware NMF architecture according to an embodiment of the invention, a schematic illustration of an initial target/residuals matrix Q and associated row (R) and column (C) factor matrices, and details of row and column memory block-to-processor block allocations for the parallel hardware NMF architecture of FIG. 4a;

Figure 2:
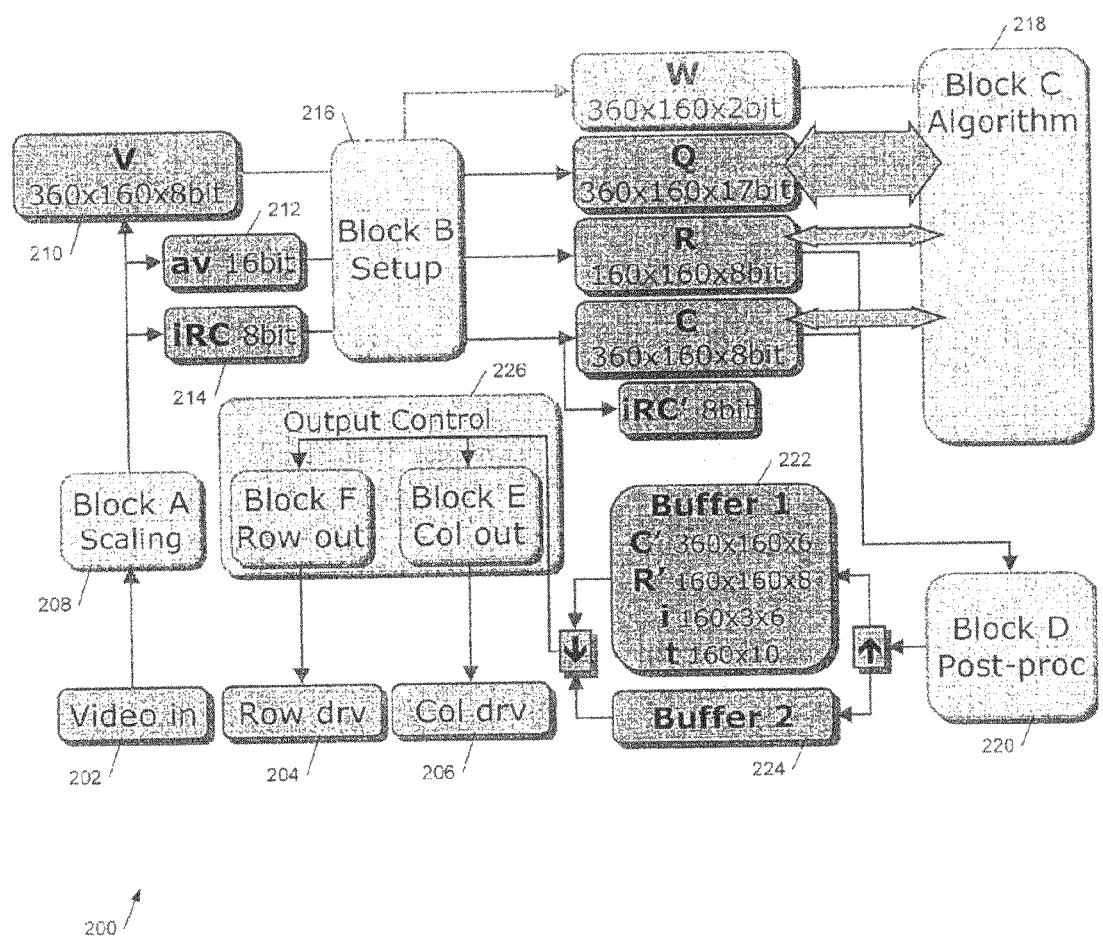
FIG. 2 shows a functional block diagram of an OLED display driver system incorporating NMF hardware.

Referring now to FIG. 2, this shows a functional block diagram of an OLED display driver system 200 incorporating NMF hardware to perform TMA (Total Matrix Addressing). As illustrated the system has a video feed input and provides row and column drive data outputs 204, 206 for driving a TMA driven display (not shown). We will describe later a preferred embodiment of an NMF hardware accelerator for implementing the system of FIG. 2 and, in particular, for performing the preferred NMF calculation described in the introduction. However it will be understood that FIG. 2 shows the operation of the system mapped onto a number of functional blocks, and that in a hardware embodiment (as described later) the assignment of hardware blocks to these functions may differ from the functional assignment of blocks illustrated. For example, the hardware accelerator described later may be controlled by software running on a digital signal processor (DSP) to implement some of all of the (non-NMF) functional blocks shown. In some preferred embodiments however substantially all the functions illustrated are implemented on an FPGA.

Continuing to refer to FIG. 2, block A 208 performs scaling. In particular this block performs the following functions:
1. Read a (the next) next frame from video input 202, scales this to a desired resolution, for example, 360×160 resolution (preferably using averaging rather than sampling to scale), stores this in V memory 210 with 8-bits per colour, optionally after performing a colour transform (see below). While reading the average luminance of the frame is also calculated (via the gamma lookup table, see step 2 of block B below) and store as a 16-bit value in register av 212.
2. Calculate iRC=sqrt(av/160) stored as 8-bits in register 214.
3. Flag complete to block B 216.
4. Wait for completion flag from block B.
5. Loop back to step 1.

Block B 216 performs setup functions. In particular this block performs the following functions:
1. Wait for completion flag from block A.
2. Set each value of Q=gamma(V)−av where gamma( ) represents a lookup table to translate an 8-bit grey level to a 16-bit luminance.
3. Wait for completion flag from block D 220.
4. Set each element of C and R to iRC.
5. Set iRC'=iRC.
6. Flag complete to blocks A 208 and C 218.
7. Wait for complete flag from block C then loop back to 1.

Block C 218 performs hardware accelerated NMF functions. In particular this block performs the following functions:
1. Wait for complete flag from block B.
2. Perform an NMF function, for example as specified below.
3. Flag complete to blocks D and B.
4. Loop back to 1.

Block D 220 performs pipelined post-processing. In particular this block performs the following functions:
1. Set buffer 1 222 to blank display (C'=R'=i=0, t=1).
2. Reserve buffer 2 224.
3. Flag complete to block B 216.
4. Wait for complete flag from block C 218.
5. Generate R', C', t and i, for example as described below, and write to current buffer.
6. Signal new buffer ready to output control blocks 226 and wait for confirmation.
7. Swap buffer.
8. Loop back to 3.

Figure 1A:
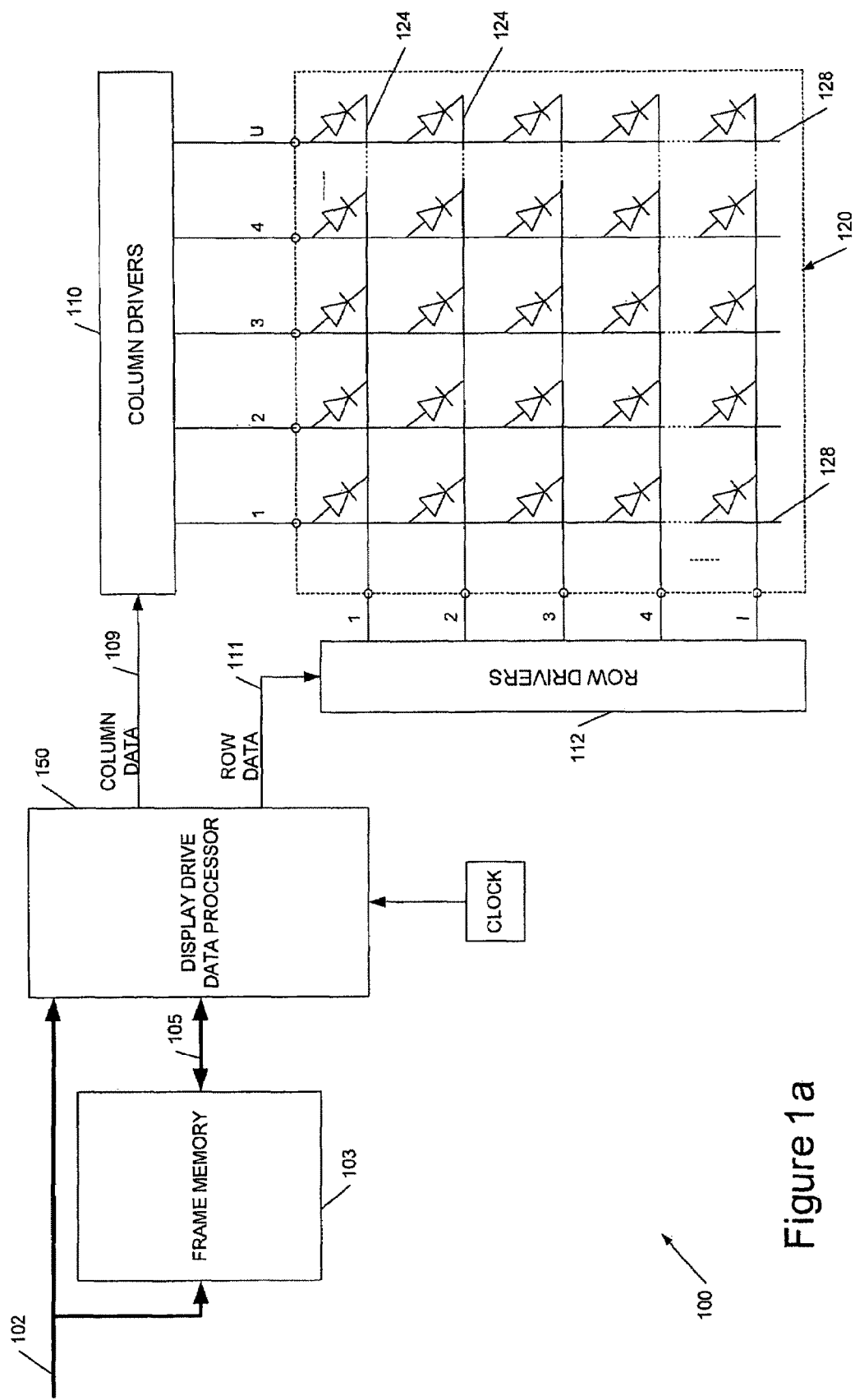
FIGS. 1a and 1b show, respectively, an OLED display and driver including an NMF hardware accelerator according to an embodiment of the invention, and details of example row and column drivers for the display.
Figure 1B:
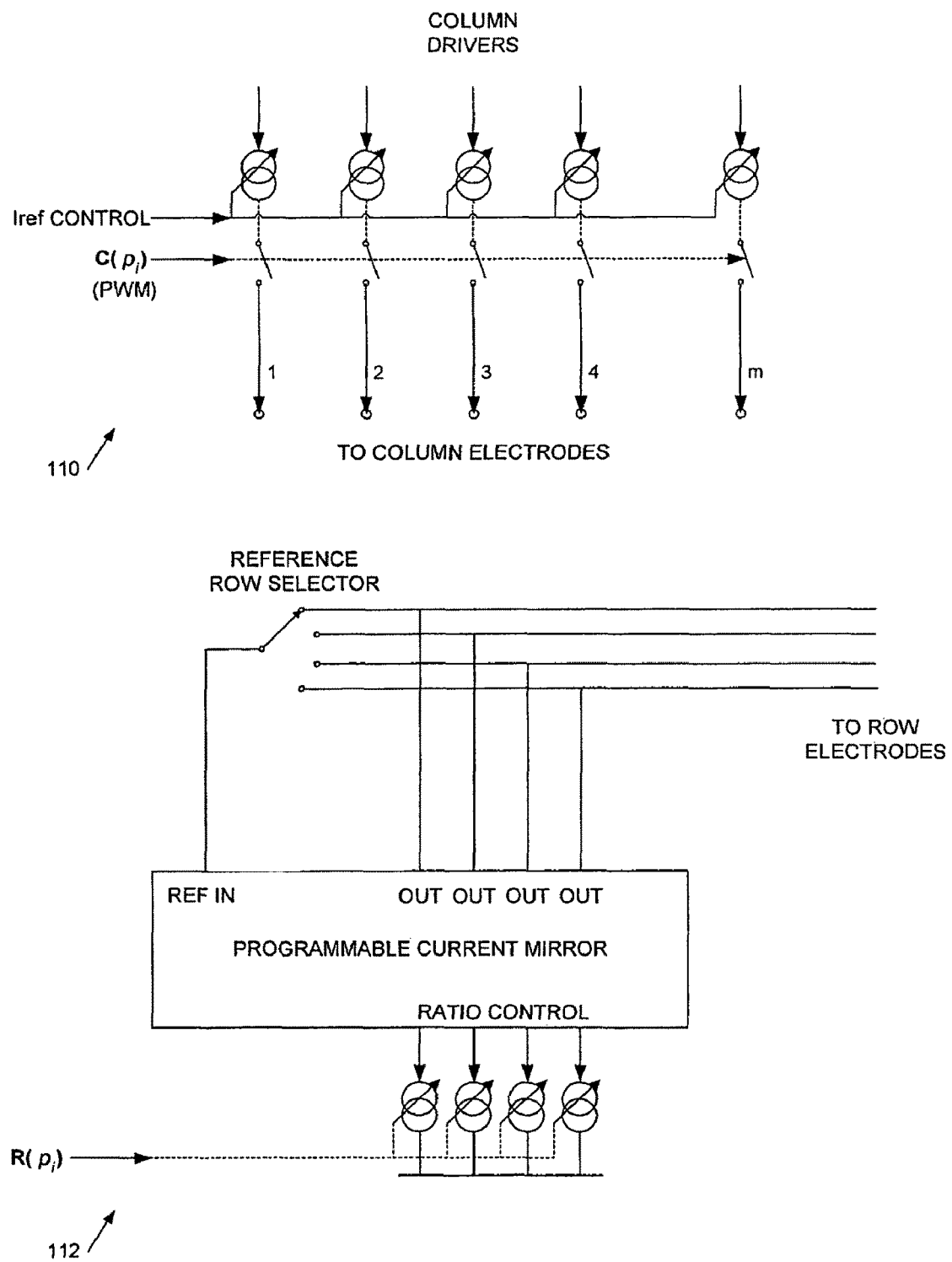
Figure 3:
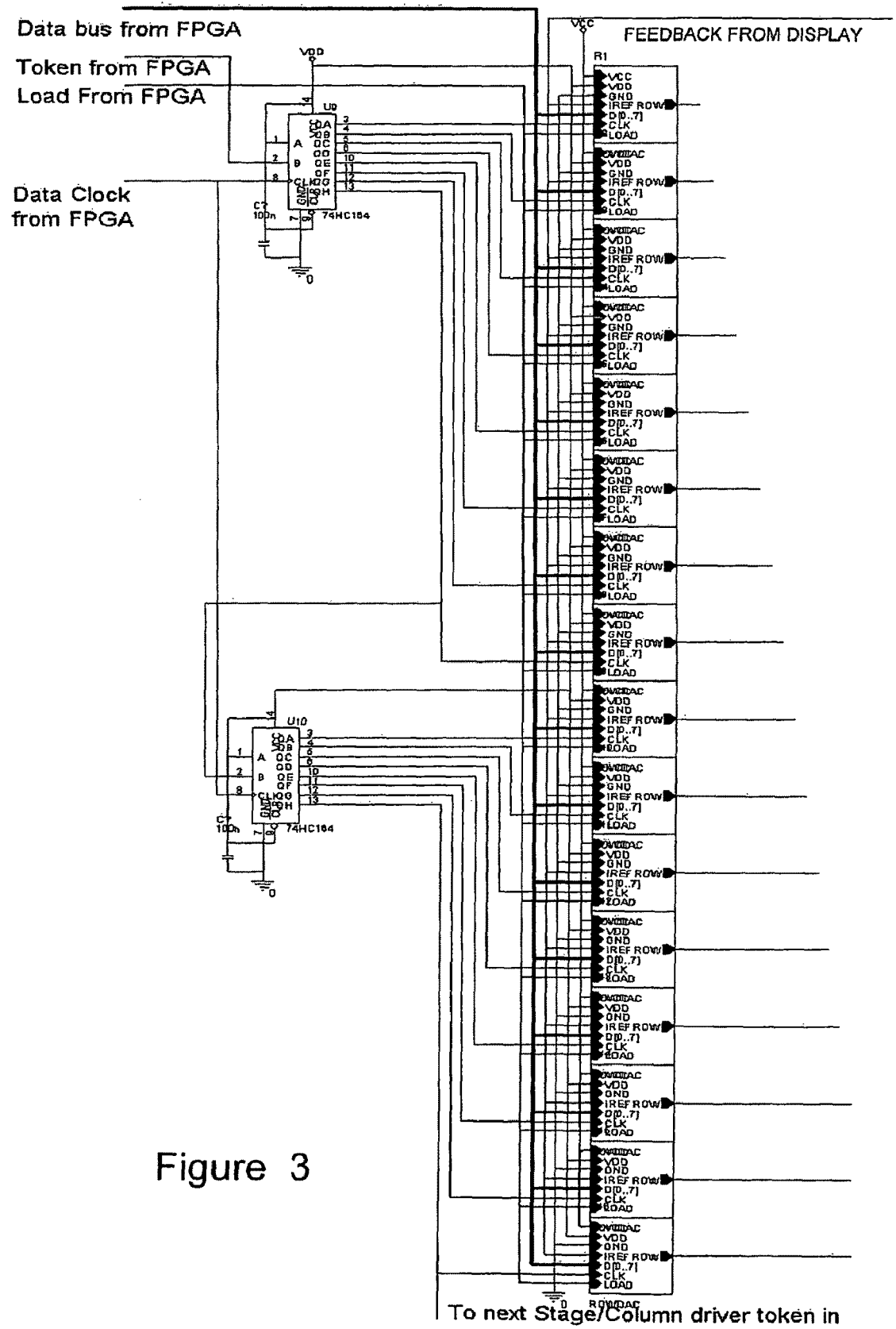
FIG. 3 shows details of example row driver hardware for the system of FIG. 2.

Output blocks 226 E and F perform output control functions. These blocks read data from the frame buffer and output it to the row and column drivers. FIG. 3 shows details of example row driver circuitry for the system of FIG. 2, which determines row drive ratios in a similar manner to the arrangement of FIG. 1b. Likewise column driver circuitry as shown in FIG. 1b may be employed. If desired suitable a column driver integrated circuit, such as the STV8810 from STMicroelectronics, Switzerland (384 Column Driver for Colour/Monochrome Passive Matrix), may be used, in which case the system may generate timing signals for driving this IC. Each driver 204, 206 clocks sub-frame data through a shift register, and when all the data is in place the data and the previous sub-frame has timed out the data is 'loaded' and then drives the display. If preferred one data port can be used and the data token clocked through the row driver into the column driver. The current output by the column drivers is also set, in embodiments via a serial port of the column driver. If necessary the column driver may be set up via the serial port. Preferably sub-frame timing (t) is controlled by the system, as described below. During the on sub-frame display period the data for the next sub-frame is loaded.

In one embodiment on average the time to load a sub frame with 520 (360+160) data samples is 1/(90 Hz)/(160 sub-frames)=69 µs. The sub-frame time was variable between 10 µs and 11 ms and the maximum required output data rate was thus 47 MB/s. In this embodiment the pixel clock clocked 63 times in time t, and the minimum t was 10 us giving a maximum clock rate of 6.4 Mhz. The maximum t was 11 ms giving a minimum clock rate of 5.7 kHz. Preferably the clock accuracy should be sufficient to substantially guarantee 63 cycles in time t. If t is 0 for a sub-frame then this sub-frame is skipped (there may be consecutive sub-frames with zero time).

We next describe display data processing in more detail, in particular pre-processing, one embodiment of a basic core NMF procedure, post processing, and other optional but desired components. In preferred implementations the system is able to operate at substantially full video rate (25 frames per second).

Table 1 (below) gives a brief description of each variable, with storage requirements.

TABLE 1

Summary of variables

| Variable | Storage (bits) | Accessed by ... | Comments |
|---|---|---|---|
| V | 360 × 160 × 8 | A, B | Original image (grey-scale values) |
| av | 16 | A, B | Average luminance of V |
| iRC | 8 | A, B | Initial values of R and C |
| Q | 360 × 160 × 17± | B, C | Remaining error between V and R × C |
| R | 160 × 160 × 8 | B, C, D | Current row matrix |
| C | 360 × 160 × 8 | B, C, D | Current column matrix |
| W | 360 × 160 × 2 | B, C | OPTIONAL weighting matrix |
| iRC' | 8 | B, C | Value to which R and C were initiated |
| Output buffers | 2 × 555,840 | D or output control F, E | Output matrices are double-buffered |
| C' | 360 × 160 × 6 | D, E | Output column timings |
| R' | 160 × 160 × 8 | D, F | Output row current ratios |
| i | 160 × 3 × 6 | D, E | Sub-frame RGB reference currents |
| t | 160 × 10 | D, output control | Sub-frame timings |

±= signed. All other values are unsigned.

We first describe preferred pre-processing, in particular colour gamut shift.

The core procedure operates on three (optionally four—see below) matrices, Q, R and C, as well as the value of iRC. These matrices are seeded based on some simple manipulations of the input image, held in the matrix V. V holds the 8-bit grey-scale values of the image, rather than the un-gamma'd pixel luminances, in order to save on space.

The image is read from the video source, scaled (by pixel averaging) to the resolution of the display, and rotated to match the format of the display. The result is stored in V.

The following equations describe the rest of the calculations required. The gamma( ) function referred to is a look-up table relating 8-bit gray-scale values to 16-bit luminance values. This look-up table may assume a gamma of 2.4 with the maximum 8-bit value (255) mapping to 65024. The gamma function may also carry out colour transformation using the equation for R', G', B' below, to correct the input RGB signal to the colours of the PLED (polymer LED) primaries. The matrix M specified may be programmable and stored as an array of signed 12-bit integers. Initially the matrix can be set to 256*the identity matrix.

$$R' = (M_{11}R + M_{12}G + M_{13}B)/256$$

$$G' = (M_{21}R + M_{22}G + M_{23}B)/256$$

$$B' = (M_{31}R + M_{32}G + M_{33}B)/256$$

$$av = \text{average}(\text{gamma}(V_{xy}))$$

$$iRC = (av/160)^{0.5}$$

$$Q_{xy} = \text{gamma}(V_{xy}) - av$$

Lastly, all elements of R and C should be set to equal iRC. The value of av may be calculated during read-in of V, for example by using of a gamma table lookup both in blocks A and B, neither of which should require access simultaneously. However alternative implementations are possible.

Referring again to Block C 218 (hardware accelerated NMF), in one embodiment the basic procedure performs the following four steps (equations) in order, for each iteration (i=1 to 20) and for each sub-frame p (p=1 to 160) within each iteration:

for each $x$ and $y$; $Q_{xy} = Q_{xy} + R_{py}C_{xp}$ for each $y$; $R_{py} = \dfrac{360 * \text{bias} * iRC + \sum_{x} Q_{xy}C_{xp}}{360 * \text{bias} + \sum_{x} C_{xp}C_{xp}}$ for each $x$; $C_{xp} = \dfrac{160 * \text{bias} * iRC + \sum_{y} Q_{xy}R_{py}}{160 * \text{bias} + \sum_{y} R_{py}R_{py}}$ for each $x$ and $y$; $Q_{xy} = Q_{xy} - R_{py}C_{xp}$ The fixed value bias is a weighting, which may be zero but which, in embodiments, may have a value of between 64 and 128. In embodiments 5 to 100, for example around 20 iterations are performed for each sub-frame. The values obtained for $R_{py}$ and $C_{xp}$ are preferably truncated to the unsigned 8-bit storage of R and C (and set to the appropriate limit if <0 or >255). In the equations for $R_{py}$ and $C_{xp}$ the denominator does not change and therefore does not need to be re-calculated for each y (for $R_{py}$) or x (for $C_{xp}$) (although this is not the case for some variants discussed below). The temporary storage values of the numerator and denominator are preferably of sufficient bits that there is no loss of precision until the division. Preferably the hardware NMF is pipelined to allow substantially parallel evaluation of two or more of the sum/product elements in the above four equations.

We next describe post processing which in preferred embodiments, in effect, performs scaling to allow substantially direct drive of column currents (by pulse width modulation) and row ratios from the system of FIG. 2. This post-processing may be performed in a number of different ways, but the general steps are illustrated by the equations given below. The skilled person will understand that the scaling factors and the like given may be modified according to a particular application.

Thus in one embodiment the steps employed to process the data held in R and C for output are as follows:

for each $p$: $R_p^{max} = \max(R_{py})$ and $C_p^{max} = \max(C_{xp})$ then:

$T = \sum_{p} R_p^{max} C_p^{max}$ and sub-frame time $t_p$ is given by:

$$t_p = \frac{2^{10} R_p^{max} C_p^{max}}{T},$$

truncated to 10 bits

If a value of $t_p$ overflows (only the case when only one sub-frame contains any information) it may be set to 1023.

Now we scale C using $t_p$ and the column reference currents (in preferred embodiments the rows are automatically ratioed, for example row driver of the type described with reference to FIG. 1b, although in other embodiments specific row drive values could be calculated for each row):

$$\text{for each } p: R_p^{sum} = \sum_y R_{py} \text{ and}$$

$$i_{pc} = \frac{R_p^{sum} C_p^{max} i_{0c}}{10000 t_p},$$

preferably truncated to 6 bits for each of red, green and blue where $i_{0c}$ is a set of three, 6-bit, values, preferably externally programmable, representing the nominal reference currents for the red, green and blue pixels. Example default values are 51,39,51.

We then preferably scale (stretch) C up to an appropriate PWM drive given $R_p^{sum}$ (although in other embodiments the PWM clock could be varied):

$$C'_{xp} = \frac{63 C_{xp} R_p^{sum} i_{0c}}{10160 i_{pc} t_p},$$

truncated to 6 bits

In this equation the x values are in colour order RGBRGB . . . , so for x=1 we use $i_{o1}$ and $i_{p1}$, for x=2 we use $i_{o2}$ and $i_{p2}$, and so forth. Then:

for each p, $R'_{xp}=2^n R_{xp}$, such that $128 \leq 2^n R_p^{max} \leq 255$

The column and row display drivers are then provided with $C'_{xp}$ and $R'_{xp}$.

Modifications to the above procedure possible. For example perceptual colour noise reduction is possible, for a little extra calculation, based on the observation that noise on the green channel of an image is more noticeable than noise on the red or blue channels. This modifies the above equations for the basic NMF procedure as follows:

$$\text{for each } y; R_{py} = \frac{360 * \text{bias} * iRC + \sum_x Q_{xy} C_{xp} cw_x}{360 * \text{bias} + \sum_x C_{xp} C_{xp} cw_x}$$

$$\text{where the colour weighting } cw_x = \begin{cases} 1 & \text{for red, blue} \\ 2 & \text{for green.} \end{cases}$$

Another variant reduces low grey-level noise, although it requires significant extra calculation, albeit offers potentially significant improvement in the final image. The procedure we have described above works to minimise the linear error in the image generated on the screen. However as perception is highly nonlinear this tends to result in an increased perceptual error at low luminance levels (a 1 bit change represents a larger percentage change). This can be corrected by including a weighting factor W based on V (optional, depending upon the implementation). In this embodiment W is defined as set out below (note that the weight $W_{xyp}$ referred to earlier is a generalised weighting factor):

$$W_{xy} = \begin{cases} 0 & 192 \leq V_{xy} < 255 \\ 1 & 106 \leq V_{xy} < 192 \\ 2 & 54 \leq V_{xy} < 106 \\ 3 & 0 \leq V_{xy} < 54 \end{cases}$$

Use of W modifies the NMF equations as follows:

$$\text{for each } y; R_{py} = \frac{360 * \text{bias} * iRC + \sum_x Q_{xy} C_{xp} 2^{\wedge} W_{xy}}{360 * \text{bias} + \sum_x C_{xp} C_{xp} 2^{\wedge} W_{xy}}$$

$$\text{for each } x; C_{xp} = \frac{160 * \text{bias} * iRC + \sum_y Q_{xy} R_{py} 2^{\wedge} W_{xy}}{160 * \text{bias} + \sum_y R_{py} R_{py} 2^{\wedge} W_{xy}}$$

Additionally the colour weighting factor mentioned above can also be included, for example by increasing W to three bits and adding 1 for each green pixel, or by hard-coding a bit shift for each green column. Inclusion of this optional feature requires the recalculation of the denominators for each ratio, thus significantly increasing the number of calculations required per iteration. As a counterbalance to this the resultant solution is superior and converges more quickly.

We now describe further details of a preferred hardware architecture for this system.

Hardware Implementation—Details

We will describe in detail a hardware implementation which was made on a Xilinx Virtex-4 SX35 FPGA which achieves a frame rate of 25 fps with 20 iterations for each 160 sub-frames. The implementation includes pre- and post-processing of the data as described above.

In a similar manner to that previously described, one iteration of the procedure comprises NUM_ITERATIONS repeated executions of the equations below, one for each subframe p:

$$Q_{xy} = Q_{xy} + R_{py} C_{xp} \tag{1}$$

$$R_{py} = \frac{360 \times \text{bias} \times iRC + \sum_x Q_{xy} C_{xp}}{360 \times \text{bias} + \sum_x C_{xp} C_{xp}} \tag{2}$$

$$C_{xp} = \frac{160 \times \text{bias} \times iRC + \sum_y Q_{xy} R_{py}}{160 \times \text{bias} + \sum_y R_{py} R_{py}} \tag{3}$$

$$Q_{xy} = Q_{xy} - R_{py} C_{xp} \tag{4}$$

where $$0 \leq x \leq \text{NUM\_COLS} - 1 \tag{5}$$
$$0 \leq y \leq \text{NUM\_ROWS} - 1$$
$$0 \leq p \leq \text{NUM\_SUBFRAMES} - 1$$

bias is some weighting value, and iRC are initial values for the row and column memories.

The algorithm begins with a matrix Q which is set equal to a target image or to an image matrix derived therefrom. This is held in memory and has dimensions NUM_ROWS×NUM_COLS, with all elements of the R and C memories set equal to iRC. Since the algorithm uses NUM_SUBFRAMES subframes, the memories for holding R and C data are of size NUM_ROWS×NUM_SUBFRAMES and NUM_COLS× NUM_SUBFRAMES respectively.

We describe a parallel implementation of these equations, for speed, based on the pair-wise calculation of the first pair of equations (1 and 2) and then the second pair of equations (3 and 4), by a processor block. Broadly speaking, partial calculations are performed by each processor block, and many such blocks are replicated in the FPGA, allowing more than one value of Q, R and C to be read and calculated at once. In this way, a speed increase in the operation of the algorithm is obtained, sufficient to calculate the required row and column matrices, R and C, at a rate of 25 fps.

Figure 4A:
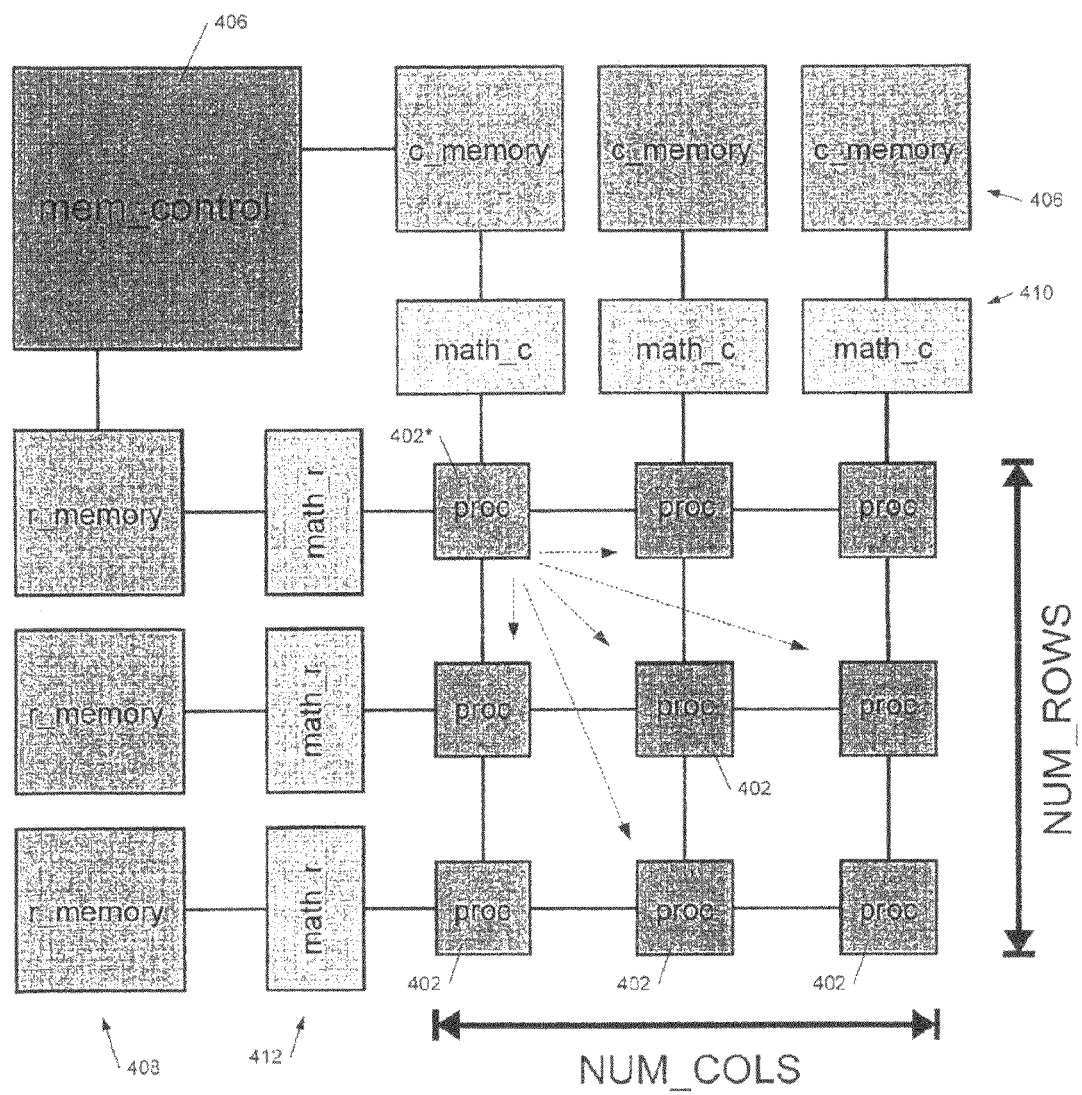

FIG. 4a shows a schematic diagram of a parallel hardware architecture 400, in which the Q memory has been segmented and incorporated into x_blocks×y_blocks processor blocks 402, each of which contains a p×q segment of the Q memory, where:

$$p = \frac{NUM\_COLS}{x\_blocks} \quad (6)$$

$$q = \frac{NUM\_ROWS}{y\_blocks}$$

The transferring in and out of the appropriate memory locations is controlled by a memory_controller block 404. All processor blocks 402 in the same row share a common C memory 406, and those in the same column share the same R memory 408. The partial results from each processor block are passed to its neighbour; this continues until the combiner (math) blocks 410, 412 are reached, where the results are combined and the division required by equations 2 and 3 is performed.

The parallel hardware architecture 400 shown in FIG. 4a is implemented by the full_proc module 500 (shown in FIG. 5) which defines inputs and outputs to the hardware and enables accelerated computation of the TMA (total matrix addressing) NMF procedure by replication of the processor blocks 402. In FIG. 4a, as described further later, one of these processor blocks 402* is a master processor block and provides control signals (indicated by dashed lines) to the other processor blocks, to save duplicating this control circuitry.

Figure 4B:
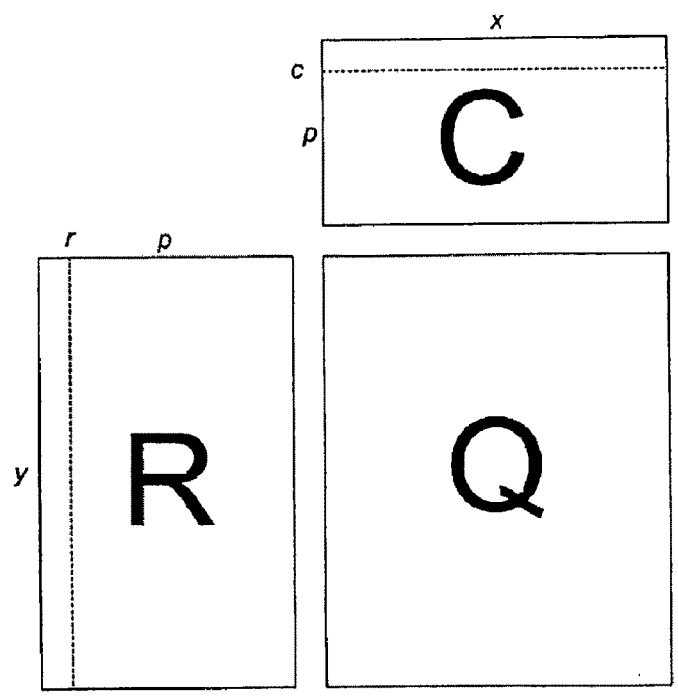
Figure 4C:
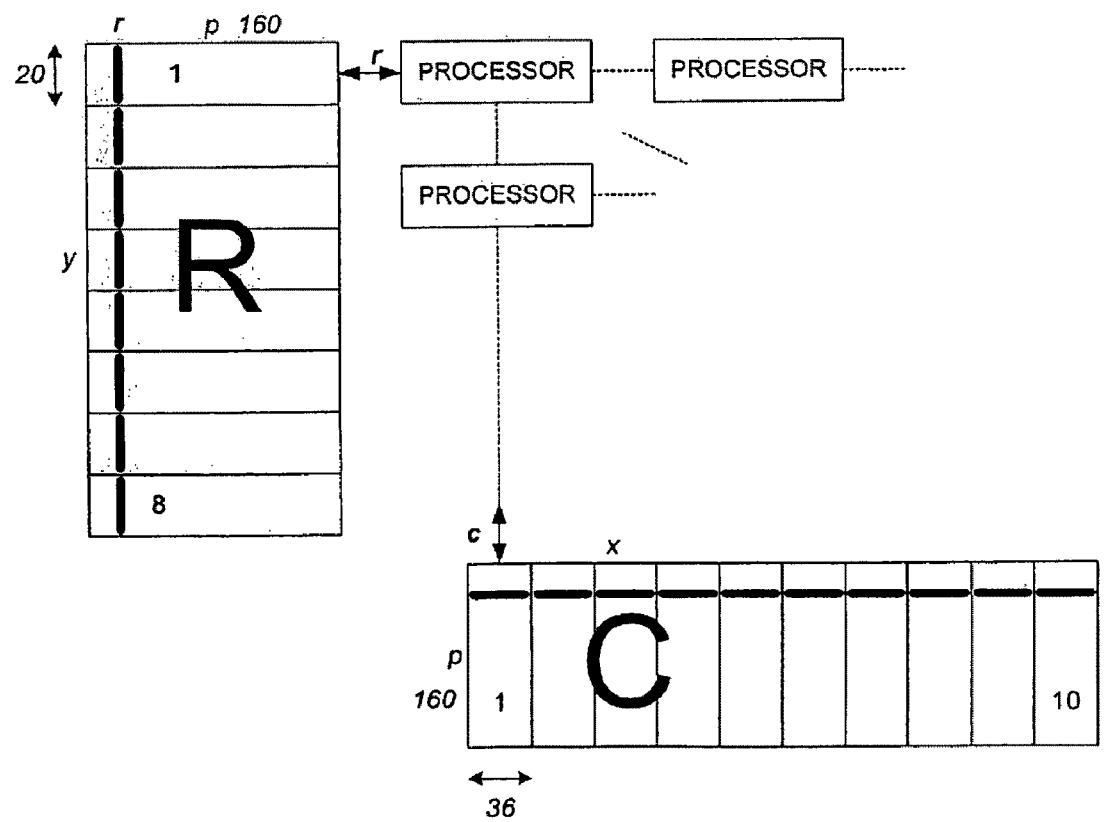

The common C (column) memory 406 is divided into blocks, each handling (storing data for) a set of columns; the common R (row) memory 408 is similarly logically partitioned. This is illustrated schematically in FIGS. 4b and 4c, where the data for 360 columns is divided "horizontally" amongst 10 processor blocks each handling 36 columns, and the data for 160 rows is divided "vertically" amongst 8 processor blocks each handling 20 rows. Thus, broadly speaking, the hardware has a tiled processor architecture in which each processor has North, South, East and West data connections, by which the processor blocks are daisy-chained to one another. As illustrated, result data flows North and West through the processor blocks towards the respective column and row math blocks and memories.

The matrix Q is stored in a distributed fashion within the processor blocks, in this example each block having a 36×20 word memory area, preferably dual-ported so it can be read from and written to simultaneously. This is preferably replicated so that once a first value of $C_{xp}$ in equation (3) has been updated using $Q_{xy}$, evaluation of equation (4) can proceed, updating Q without affecting the calculation of subsequent values of C). The matrix Q is stored in the processor blocks but never leaves—it merely stores residuals for updating R and C.

Each processor block in a row is connected to a (read/write) data bus r for the set of rows it handles; similarly each processor block in a column is connected to a (read/write) data bus c for the set of columns it handles.

To illustrate the operation of these data buses in one version of the hardware consider, for the 36 column×20 row example discussed, a computation requiring a complete set of r and c values for a processor block: To access a block of column and row data an r_valid signal is asserted whilst index 0 of the r-values is output c_valid is asserted and the corresponding (36) c-values are read. Following this c_valid is de-asserted for a clock cycle and then re-asserted and then the same set 36 c-values are read for r_index=1, and so forth until all r-values for the block have been read. Both c_valid and r_valid are then de-asserted. In another version of the hardware a complete set of c-values is read simultaneously for each r-value; alternatively a complete set of r-values may be read simultaneously for each c-value, or the r- and c-values for a block may be read sequentially as previously described, reading in a complete set of r-values for a block for each c-value (rather than a set of c-values for each r-value). The skilled person will understand that in general the order in which data is read will be chosen according to the order in which it is required for a calculation of a particular product. The products which, in a preferred embodiment, it is desired to calculate are described in more detail later with reference to FIG. 11.

Each processor block has a (result) data input and output, and these are daisy chained as shown in FIG. 4a (connecting to a 0 at the input end of each chain). Since the results from all the processors are ready at the same time, data (a single scalar result value) is shifted along the chains into the math blocks 410, 412 at the rate of one block per clock cycle. Thus 10 clock cycles are used, for example, to pass a (scalar) result West along 10 processor blocks for accumulation and further processing by a math block and subsequent storage in row memory.

Figure 5:
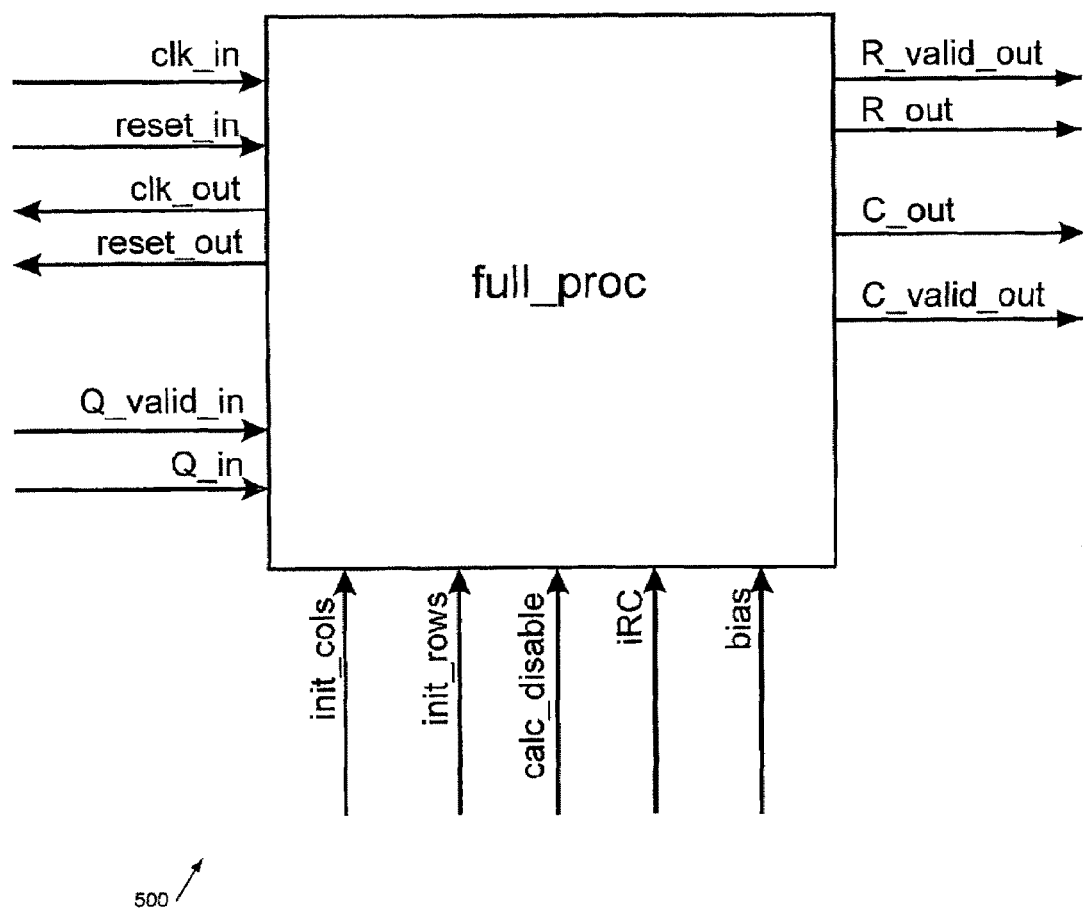
FIG. 5 shows a block diagram of a full_proc module implementing the hardware NMF architecture of FIGS. 4a and 4c.

Referring now to FIG. 5, this shows a block diagram of the full_proc module 500 (which implements the full TMA procedure), in particular showing external connections to the module. The type, width and description of each of the signals shown in FIG. 5 for a preferred embodiment is given in Table 2 below.

TABLE 2

| Signal | Type | Width | Description |
|--------|------|-------|-------------|
| clk_in | input | — | Input clock signal |
| clk_out | output | — | |
| reset_in | input | — | Input reset signal |
| reset_out | output | — | Output reset; data can be passed to the full_proc module when this signal goes low |

TABLE 2-continued

| Signal | Type | Width | Description |
|---|---|---|---|
| Q_in | input | [15:0] | Input data to Q memories |
| R_out | output | [7:0] | |
| C_out | output | [7:0] | |
| R_valid_out | output | — | High when data in R and C memories is valid |
| C_valid_out | output | — | |
| Q_valid_in | input | — | High when data in Q memory is valid |
| init_cols | input | — | Input signals specifying valid row and column write data. Should be high for as long as the row and column memories are being addressed. |
| init_rows | input | — | |
| bias | input | [7:0] | |
| iRC | input | [7:0] | Input data to set initial values of R and C memories |
| calc_disable | input (debug) | — | Prevents loading of video frames |

In a preferred embodiment the full_proc module 500 is initialised as follows:
1. A suitable clock signal is applied to clk_in
2. The reset_in is initially set high, and then low after at least 100 ns.
3. No data is passed to the full_proc module before the reset_out signal goes low. Since this is the inverse of the LOCKED output of the FPGA's digital clock manager (DCM), which is controlled by a buffered version of clk_in, a delay is observed before the reset_out signal becomes valid.

Once the reset_out line goes low, the user is permitted to pass Q and iRC data to the full_proc module.

Figure 6:
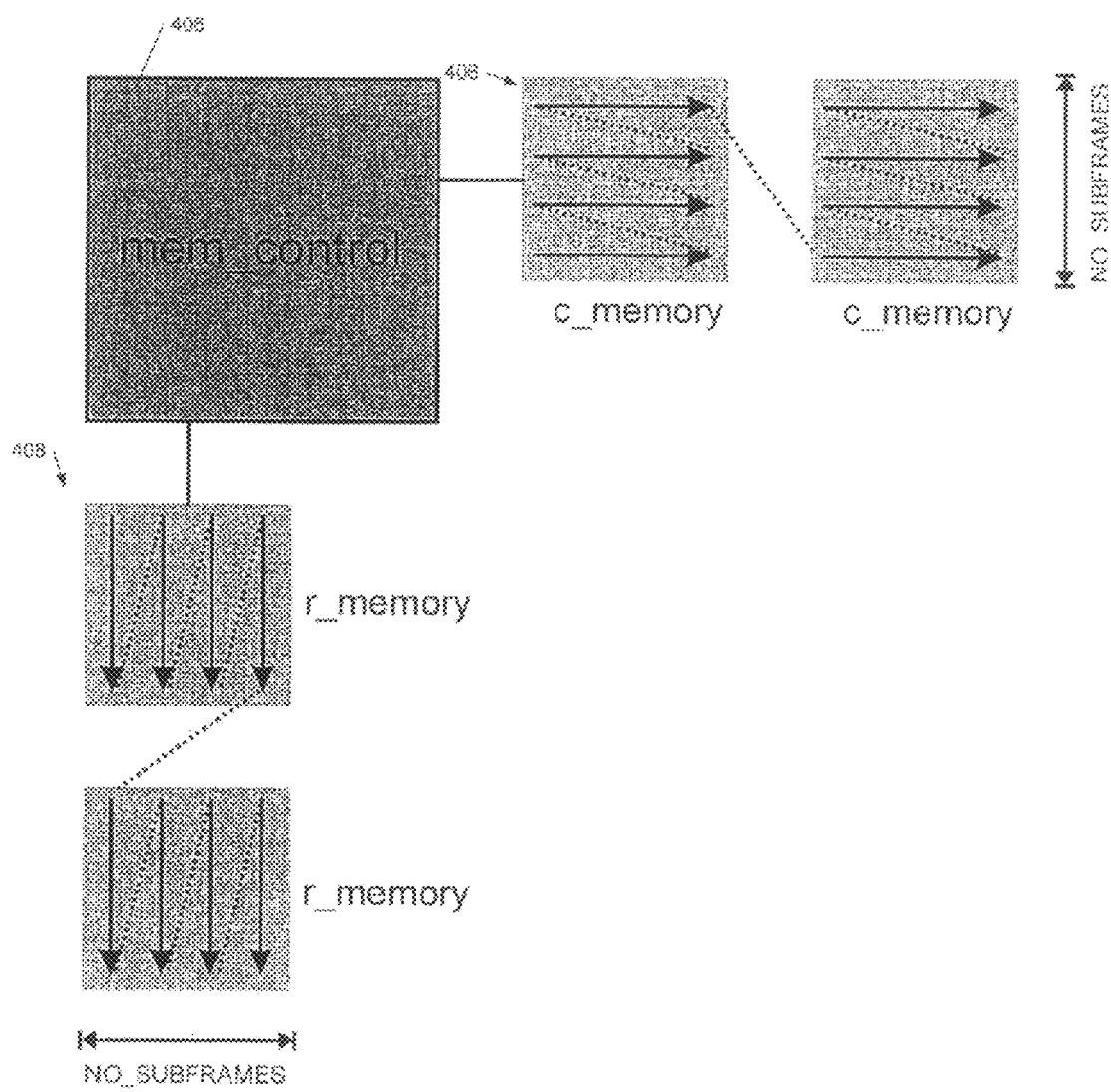
FIG. 6 shows a procedure for loading R and C memory.

We next further describe passing data between blocks. Since the Q-memory is segmented, and because R and C memories contain more than one subframe's worth of data, data should be loaded into the Q, R and C memories in the correct order. FIG. 6 shows the order of R and C memory loading (i.e. blockwise, data for a set of subframes at a time), which is complicated by the presence of a number of image subframes. The arrows depict the order in which the data elements of each memory are accessed, once at the start of the algorithm when the memories are loaded with iRC, and once at the end when they contain the desired result.

The following procedure is preferably used when loading the R and C memories:
1. At the start of the algorithm, the appropriate value of iRC should be chosen and the init_rows and init_cols lines should be assered for NUM_ROWS×NUM_SUB-FRAMES and NUM_COLS×NUM_SUBFRAMES clock cycles, respectively (i.e. writing iRC into all rows and columns).

2. The signals kr_bias, kc_bias, kr_bias_iRC and kc_bias_iRC should be set to the correct values at all times, where $kr\_bias = NUM\_ROWS \times bias$ $kc\_bias = NUM\_COLS \times bias$ $kr\_bias\_iRC = NUM\_ROWS \times iRC \times bias$ $kc\_bias\_iRC = NUM\_COLS \times iRC \times bias$ (7)

Figure 7:
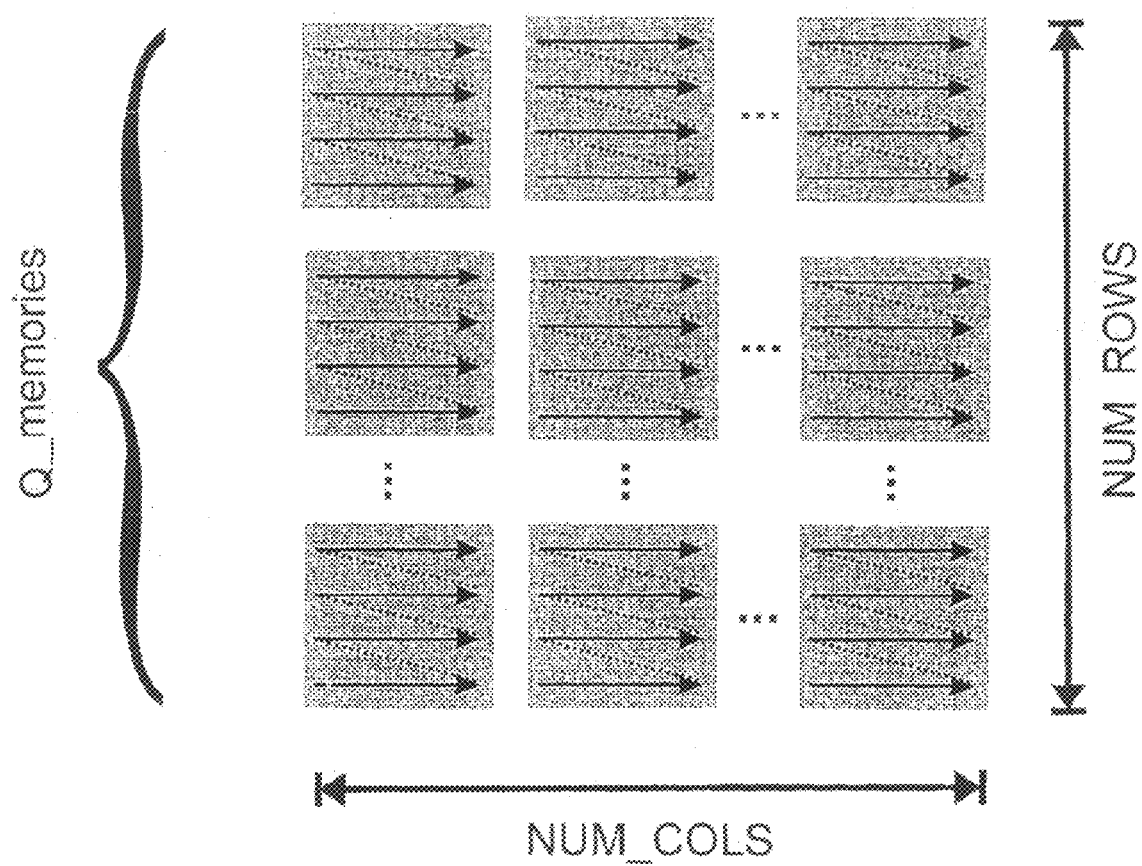
FIG. 7 shows a procedure for loading distributed Q memory blocks.

The Q-memory data is loaded into each processor's memory by shifting sequentially through the processor blocks in the southerly direction, as depicted by the arrows of FIG. 7 (as can be seen, this involves, reordering image pixels into locations in the Q memories). The columns of each processor's Q block memory are accessed simultaneously.

The loading of all segmented Q memories takes NUM_COLS×NUM_ROWS clock cycles, so a preferred procedure for loading the Q memory is:
 The signal Q_valid is asserted when the first value of the image matrix is passed to full_proc, and held high for NUM_COLS×NUM_ROWS while the Q memories are loaded with the values of the Q matrix.

We now describe details of the operation of submodules of the full_proc module shown in FIG. 5. We begin with rc_mem_control.

Figure 8:
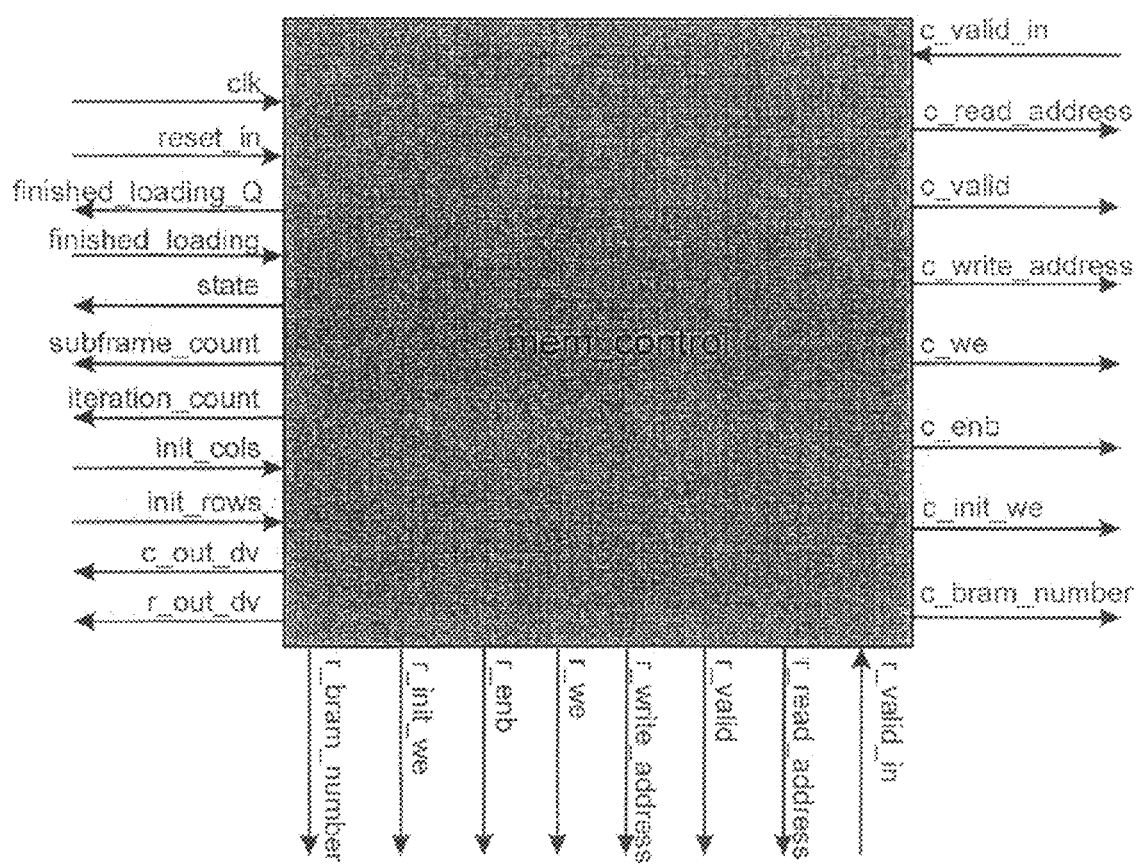
FIG. 8 shows a block diagram of a memory control module.

The connections to the rc_mem_control module, which comprise data loading and unloading signals, row/column memory control lines, and debugging signals, are shown in FIG. 8. The rc_mem_control module acts as a memory controller for the row and column memories. Responsive to the current state of its internal state machine, rc_mem_control provides appropriate addresses for the row and column memories. The description of each of the signals shown in FIG. 8 is provided in table 3 below.

TABLE 3

| Signal | Type | Width | Description |
|---|---|---|---|
| init_cols/rows | Input | — | User supplied value of iRC |
| row_col_math_c/r | Input | — | Connections to row_col_math blocks. |
| c/r_valid_in | Input | — | Controls the incrementing of c/r_write_address. This depends whether the row_col_math blocks indicate that there is a valid row or column in which to write data back to. |
| finished_loading_Q | Input | — | Input from the top level module indicating that the Q memories has been loaded |
| c/r_read_address | Output | [12:0], [11:0] | Controls the reading out of R and C vectors from port A of the row/column memories to the proc blocks. In the initial state 4'b000, these lines contain the respective read addresses for R and C loading and unloading. |

TABLE 3-continued

| Signal | Type | Width | Description |
|---|---|---|---|
| c/r_write_address | Output | [12:0], [11:0] | Controls the address to which data is written to the R and C memories respectively. Addresses are incremented according to the assertion of c/r_valid_in. |
| c/r_we | Output | — | Enable the writing of data back to R and C memories, |
| c/r_init_we | Output | [9:0], [8:0] | Controls write access to port A of the row/column memories. Writing is only allowed in state 4'b0000. |
| c/r_bram_number | Output | [3:0], [2:0] | The row or column memory number that is currently being read, in the range 0 to p-1 or 0 to q-1 for rows and columns respectively. |
| c/r_enb | Output | — | Disables port B of the R and C memories during data load and unload states. |
| c/r_out_dv | Output | — | asserted when R and C data read during unloading of the memories is valid. |
| c/r_valid | Output | — | Indicates that the current R and C data is valid. The proc blocks update their state depending upon these signals (see section X.X) |
| finished_loading_RandC | Output | — | Indicates that R and C memories have been loaded |
| finished_loading | Output | — | Used to indicate to the proc blocks that all Q, R and C memories have been loaded and that computation may commence. |
| state | Output (Debug) | [3:0] | Internal state machine state |
| subframe_count | Output (Debug) | [4:0] | Subframe number |
| iteration_count | Output (Debug) | [7:0] | Iteration number |

In preferred embodiments a state machine is employed to determine which memory locations are accessed, which in turn depends on the equation being evaluated. The relationship between the values of the state machine, the operation of the rc_mem_control module and the equation being evaluated is given in Table 4 below, which effectively defines the function of the machine.

TABLE 4

The internal state machine of the rc_mem_control module

| State | Exit Condition | Description |
|---|---|---|
| 4'b0000 | q_load_done = 1 | R and C memories are loaded and unloaded |
| 4'b0001 | finished_sending = 1 | C vector sent for each value of the R vector (NUM_ROWS times) to calculate $Q_{xy} = Q_{xy} + R_{py}C_{xp}$ |
| 4'b0010 | finished_sending = 1 | C vector sent once to calculate $\sum_x C_{xp}C_{xp}$ |
| 4'b0011 | finished_sending = 1 | C vector sent NUM_ROWS times to calculate $\sum_x Q_{xy}C_{xp}$ |
| 4'b0100 | finished_sending = 1 | R vector sent once to calculate $\sum_y R_{py}R_{py}$ |
| 4'b0101 | finished_sending = 1 | R vector sent NUM_COLS times to calculate $\sum_y Q_{xy}R_{py}$ |
| 4'b0110 | finished_sending = 1 | R vector sent NUM_COLS times to calculate $Q_{xy} = Q_{xy} - R_{py}C_{xp}$ |
| 4'b0111 | iteration_count | If the algorithm has finished, i.e. the iteration count = NUM_ITERATIONS − 1, then back to state 4'b0000. Otherwise, proceed to state 4'b0001. |

Figure 9:
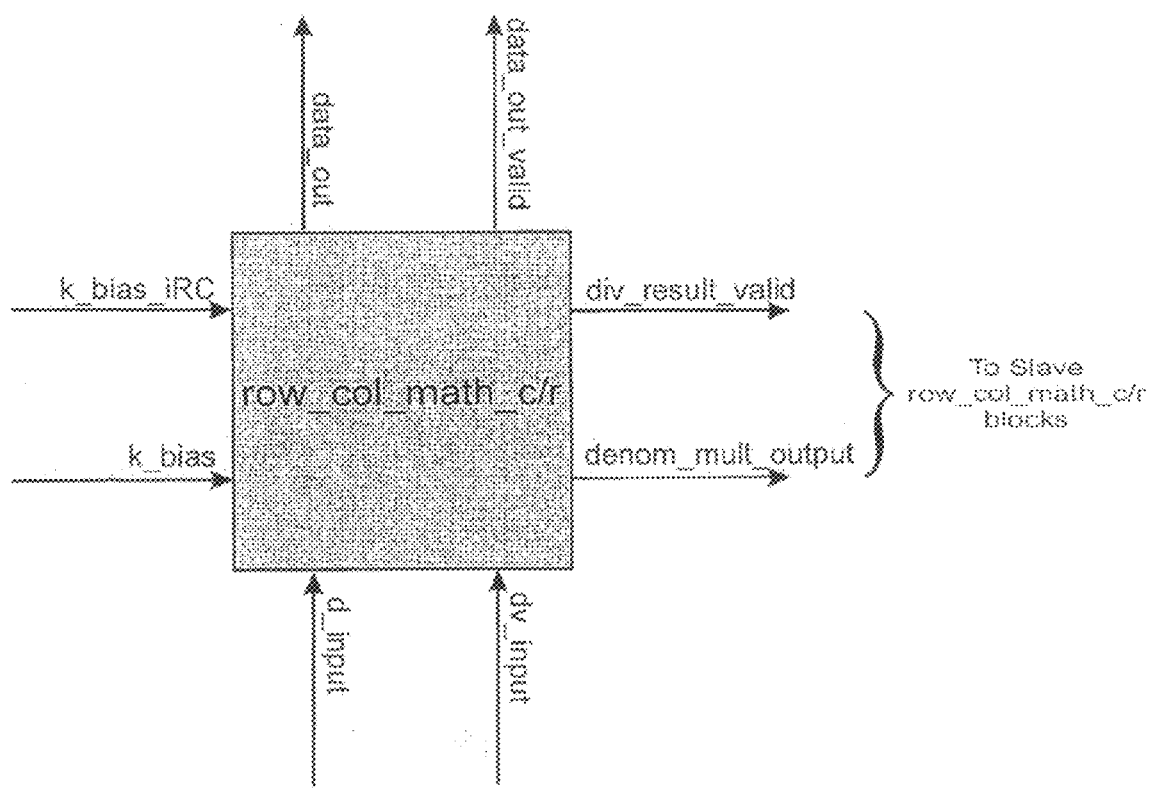
FIG. 9 shows a block diagram of a row/column math module.

We now describe row_col_math_c and row_col_math_r modules, both according to the block diagram shown in FIG. 9.

The function of the row_col_math blocks is to take data coming from the proc blocks, accumulate and perform division accordingly as described in particular by equations 2 and 3. since a divider block is expensive in terms of resources, the dividend of equations 2 and 3 is computed as the numerator multiplied by the inverse of the denominator. Since the inverse of the denominator is the same for all proc blocks, this value need only be calculated in a row_col_math master block, then passed to slave blocks. Hence, only the master block contains a divider and the rest of the slaves perform a relatively simple multiplication.

When $$\sum_y R_{py}R_{py} \text{ or } \sum_x C_{xp}C_{xp}$$

are accumulated, they are passed into a divider block in order to calculate their reciprocal. The result, multiplied by $10^{31}$, is then passed to a multiplier to effectively perform the division required by equations 2 and 3. Since the reciprocal calculation takes a relatively long time compared to the accumulation, a small FIFO is used to hold intermediate results. The description of each of the signals shown in FIG. 9 is provided in table 5 below.

TABLE 5

| Signal | Type | Width | Description |
|---|---|---|---|
| k_bias_iRC | input | [31:0] | A constant, set to the appropriate value as per equation X |
| k_bias | input | [31:0] | A constant, set to the appropriate value as per equation X |
| d_input | input | [31:0] | Q, R or C data from the proc blocks depending on the equation being calculated |
| dv_input | input | — | When high, indicates that the data on d_input is valid. |
| data_out | output | [7:0] | Contains the result of the division as specified in equations 2 and 3 |
| data_out_valid | output | — | When high, indicates that the data on data_out is valid. |
| denom_mult_output | output | [17:0] | the inverse of the denominator (either $\sum_y R_{py}R_{py}$ or $\sum_x C_{xp}C_{xp}$), output from the master block. |
| denom_mult_input | input | [17:0] | the inverse of the denominator (either RTR or CTC), input to the slave blocks. |
| div_result_valid | input/output | — | When high, indicates that the data on denom_mult_output is valid. Note that this is an output from the Master block; on all slave blocks, this signal is an input. |

Figure 10:
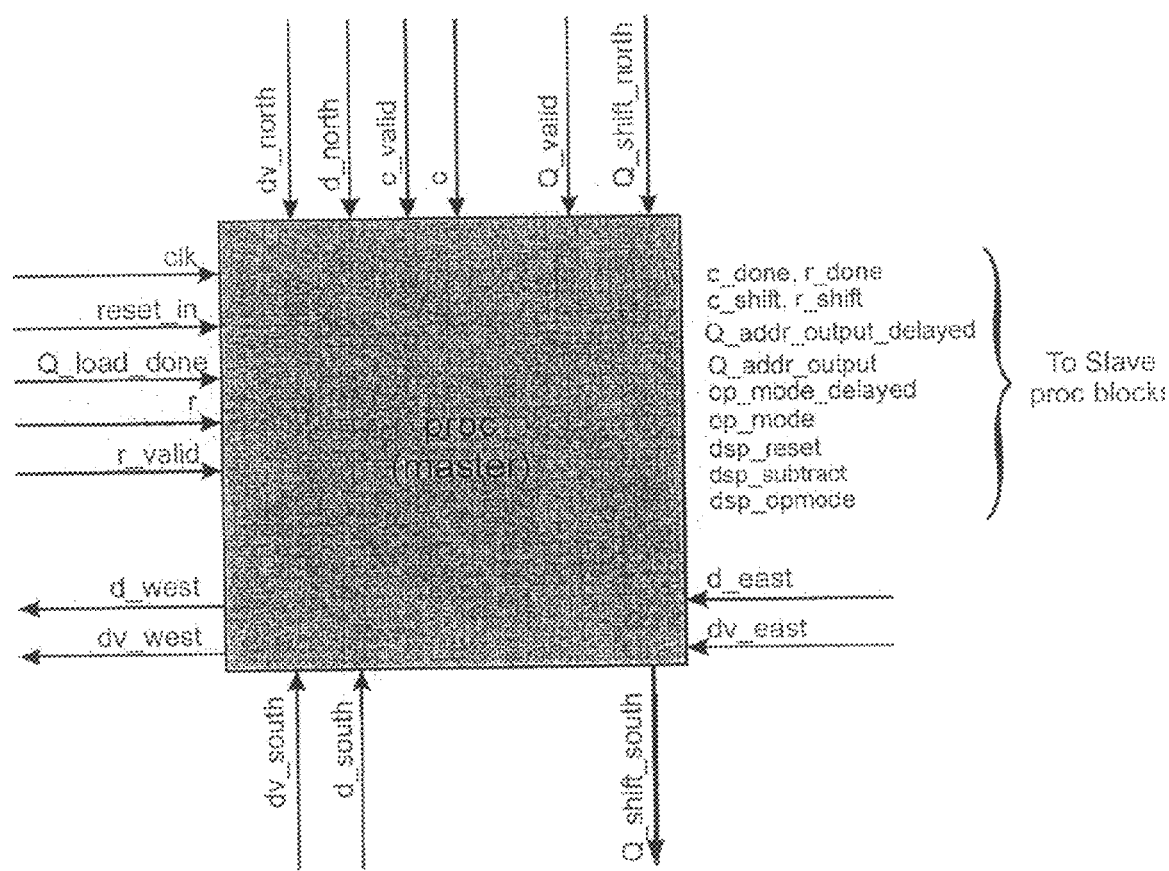
FIG. 10 shows a block diagram of a processor block module.

We now describe the proc blocks, an example of which is shown in FIG. 10. The proc blocks, which perform parts of the computations described by equations 1-4, comprise the following components:
1. Two "DSP48" (multiply-add) blocks; these perform the multiply-accumulate functions as required by equations 2 and 3
2. A block RAM which acts as the segmented Q memory
3. An address generator for the Q memory
4. A controller, for example a state machine which determines the start and end of the calculation, and which pair of equations, 1 and 2 or 3 and 4, a processor block is to calculate.

As previously mentioned, one advantage of connecting the processor blocks in the fashion shown in FIG. 4a is that, since there is interconnection between all blocks, then one proc block can act as the master and the rest can act as slaves. In this design, a substantial saving in the amount of logic results, since although the master block contains all components 1-4, the slave blocks do not contain the address generator or state machine.

The relationship between the operation of the Master proc block, the state of its internal state machine and the equation being evaluated is shown in Table 6 below, which effectively defines the function of the machine.

TABLE 6

The internal state machine of the proc block.

| State | Exit Condition | Description |
|---|---|---|
| 3'b111 | q_load_done = 1 | The initial state, in which a new Q matrix is being loaded. |
| 3'b000 | Q_addr at TOP_Q_ADDRESS | $Q_{xy} = Q_{xy} + R_{py}C_{xp}$ |
| 3'b001 | c_done = 1 | $\sum_x C_{xp}C_{xp}$ |
| 3'b010 | Q_addr at TOP_Q_ADDRESS | $\sum_x Q_{xy}C_{xp}$ |
| 3'b011 | r_done = 1 | $\sum_y R_{py}R_{py}$ |
| 3'b100 | Q_addr at TOP_Q_ADDRESS | $\sum_y Q_{xy}R_{py}$ |
| 3'b101 | Q_addr at TOP_Q_ADDRESS | $Q_{xy} = Q_{xy} - R_{py}C_{xp}$ |
| 3'b110 | Q_addr at TOP_Q_ADDRESS | The state reached at the end of the algorithm, when subftame_count = NUM_SUBFRAMES × NUM_ITERATIONS. The next state is 3'b111. |

Movement of data in the full_proc module, between individual processors, is achieved via the north, south, east and west data and data valid lines. While c_shift and r_shift are asserted, indicating that data is to be moved, data from d_south and d_east is latched onto d_north and d_west of an adjacent processor block. The same is true of the data valid lines dv_north, dv_south, dv_east, and dv_west, which are asserted when each proc block has finished a calculation. In this way, data is moved towards the north and west of the full_proc module, so that it always reaches a row/col math block. The description of each of the signals shown in FIG. 10 is provided in Table 7 below.

TABLE 7

| Signal | Type | Width | Description |
|---|---|---|---|
| clk | input | — | clock signal |
| reset_in | input | — | reset signal |
| Q_load_done | input | — | Asserted when loading of the Q memories is complete |
| r | input | [7:0] | Data from R memory |
| r_valid | input | — | When high, indicates that the data on r is valid. |
| d_north | output | [31:0] | Data lines of the proc block. The inputs (north and east) and outputs (south and west) are arranged such that the data flow within the full_proc |
| d_south | input | [31:0] | |
| d_east | input | [31:0] | |

TABLE 7-continued

| Signal | Type | Width | Description |
| --- | --- | --- | --- |
| d_west | output | [31:0] | module is nort-west, towards the row_col_math blocks. |
| dv_north | output | — | Data valid lines. When each proc block has |
| dv_south | input | — | finished a calculation, the respective lines are |
| dv_east | input | — | asserted, turning on each processor in a north- |
| dv_west | output | — | westerly order. |
| c | input | [7:0] | Data from C memory |
| c_valid | input | — | When high, indicates that the data on c is valid. |
| Q_shift_north | input | [15:0] | Used when loading the Q memories, to shift the input data into the next most southerly proc block. (See section X.) |
| Q_shift_south | output | [15:0] | Connection to Q_shift_north of the next most southerly proc block. |
| Q_valid | input | — | Asserted when loading valid Q data (see section X) |
| c/r_done | output | — | Pulsed high when r_valid and c_valid go low |
| c/r_shift | output | — | High when data is shifted through the proc blocks in the west and north directions, respectively. |
| dsp_reset | output | — | Signals controlling the operation and mode of the |
| dsp_subtract | output | — | DSP48 block within the proc block. |
| dsp_opmode | output | [6:0] | |
| Q_addr_output | input/ output | [9:0] | The memory address of the Q memory being read or written. This signal is an output of the Master proc block, and an input of all the other Slave proc blocks. |
| Q_addr_output_del | input/ output | [9:0] | The Q_addr_output signal, delayed by one clock cycle. This is an output of the Master block, and an input to all Slave blocks. |
| op_mode | output | [3:0] | The current state of the processor block, as given by Table X. |
| op_mode_delayed | output | [3:0] | The current state of the processor block, delayed by one clock cycle. |

Figure 11A:
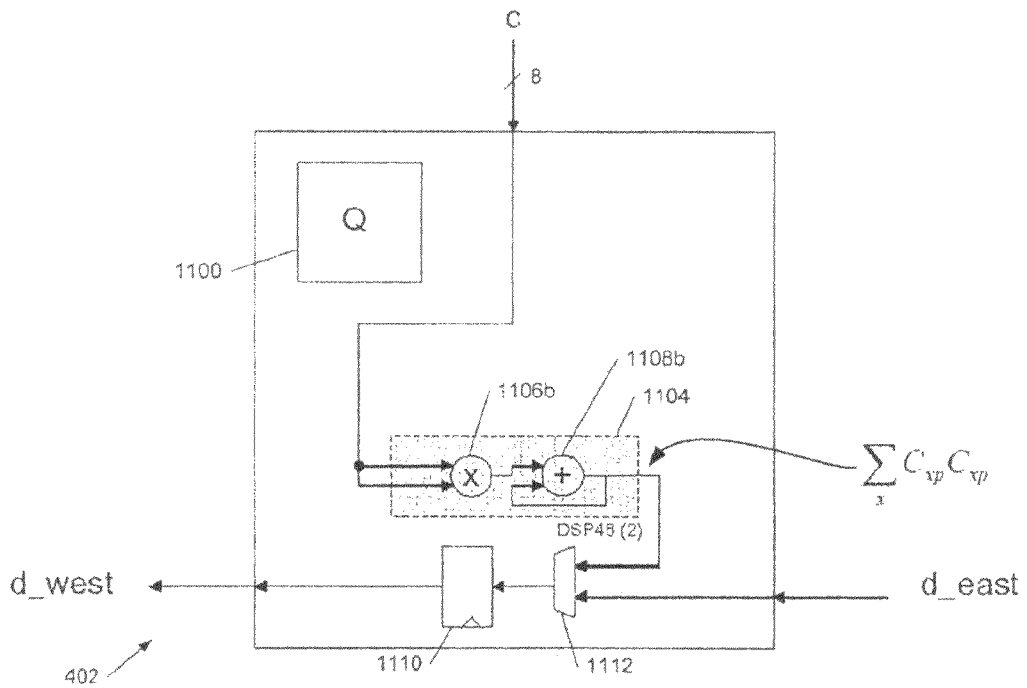
FIGS. 11a to 11d show four successive stages in the configuration of a processor block.
Figure 11B:
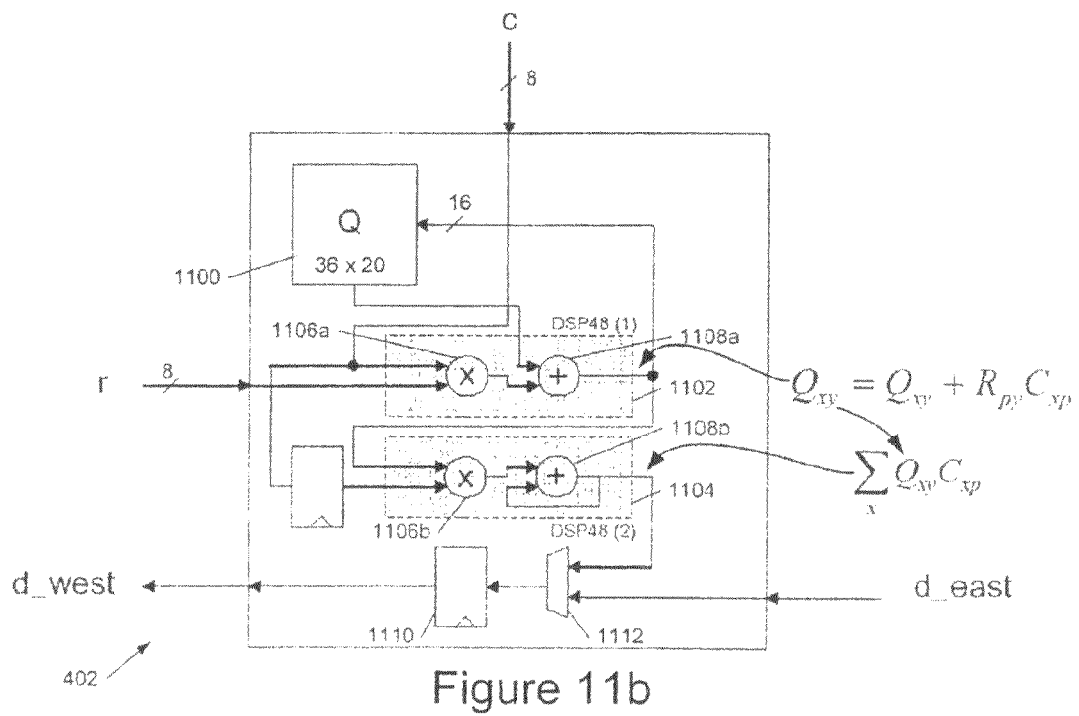
Figure 11C:
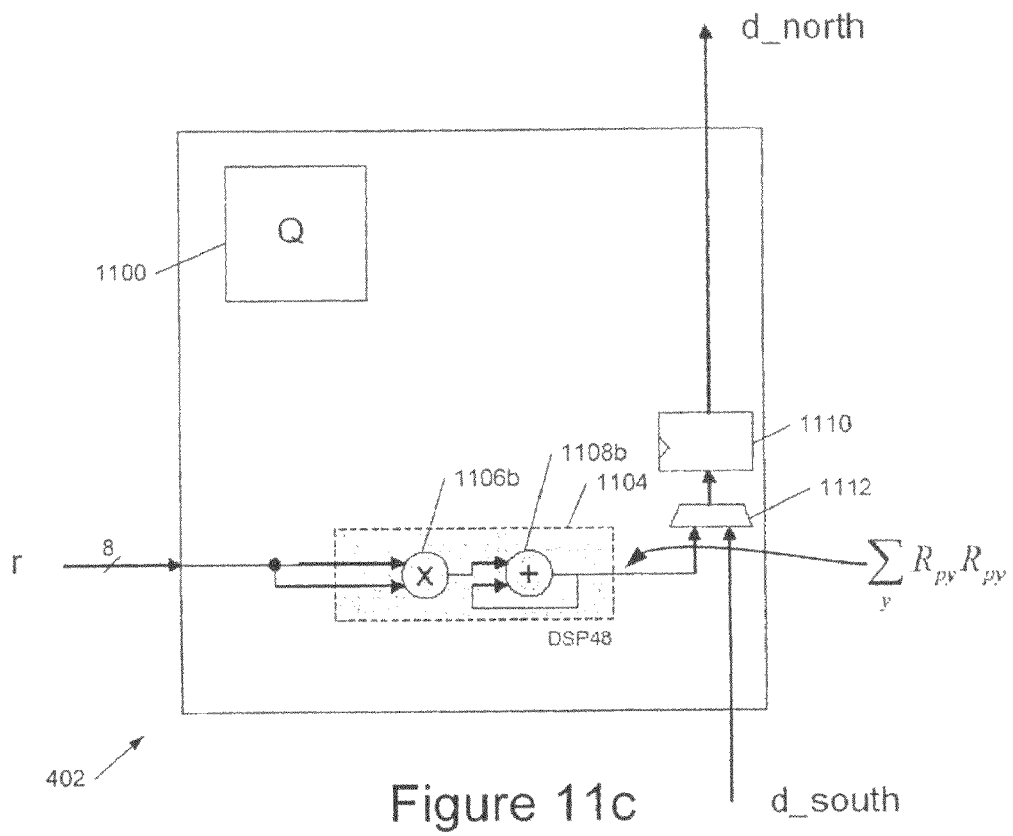
Figure 11D:
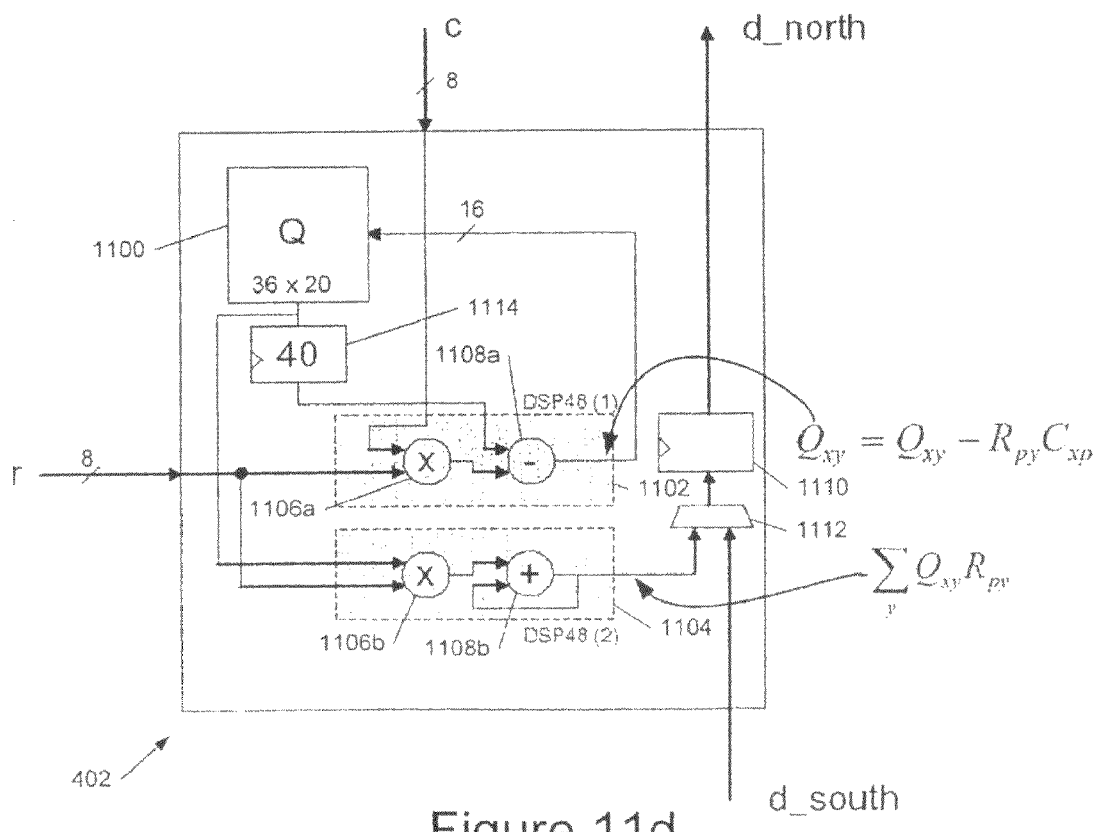

Referring next to FIGS. 11a to 11d these show four successive stages in the configuration of a processor block 402. As can be seen from FIG. 11a the processor block includes BRAM (Block Random Access Memory) 1100 for storing a portion of matrix Q. This memory is dual-ported as shown, for example, in FIGS. 11b and 11d; in one embodiment 36×20 16-bit memory locations are provided. Also included within processor block 402 are two digital signal processing modules 1102, 1104 (referred to as "DSP48s" for the aforementioned FPGA. Each of these modules comprises a multiplier 1106 coupled to an adder 1108; one of the modules 1104 is configured as a multiply-accumulate unit. The input to the DSP modules 1104, 1106 are selectable by means of mutliplexers (not shown in FIG. 11) which allow the selective connection of data input to the DSP modules to either the row r or column c buses or to the Q memory block 1100. The processor blocks 402 also include clocked latches for synchronisation. In particular, latches 1110 latch a single scalar result value so that result data can be passed along a chain of processor blocks. These latches have selectable inputs, employing multiplexers 1112 to latch either the output of a DSP module or data from a preceding processor block in the chain. As can be seen from FIG. 11d, the adder in processor block 1102 may also be configured as a subtractor. FIG. 11d also shows a buffer 1114 for storing data from Q block memory 1100 for performing the calculations of equations 3 and 4 substantially in parallel, as mentioned earlier.

Continuing to refer to FIGS. 11a to 11d, in FIG. 11a DSP module 1104 is configured to calculate c.c as illustrated. Thus the processor block, in the aforementioned example, receives 36 values of C to perform this calculation. The processor block is then reconfigured as shown in FIG. 11b so that DSP module 1102 calculates a set of Q values as shown, whilst DSP module 1104 calculates a product of Q and C as shown.

For this calculation 36 values of C may be provided for each of 20 values of R. In FIGS. 11a and 11b the result data is passed from east to west.

In FIG. 11c the processor block 402 is configured similarly to FIG. 11a, to calculate r.r, and result data is passed north. In FIG. 11d the processor block 402 is configured to calculate an updated value of Q and accumulate a product of Q and R data being passed north up the chain of processor blocks. As previously mentioned, the divisions of equations 2 and 3 above need only be performed once in one of the respective row and column math blocks, and may then be implemented by multiplying by an inverse.

We next further describe the operation of the hardware, and in particular the processor blocks, with reference to FIGS. 12a to 12e. We first describe evaluation of the first half of the algorithm.

The first half of the algorithm evaluates first:

$$d = \underline{c}_p \cdot \underline{c}_p \quad (8)$$

and then, simultaneously:

$$Q_{new} = Q + \underline{r}_p \cdot \underline{c}_p \quad (9)$$

$$\underline{r}_{p\,new} = \frac{k_n + Q_{new}\underline{c}_p^T}{k_d + d} \quad (10)$$

where $k_n$ and $k_d$ are appropriate constants.

In a preferred embodiment only the most northerly (i.e. top) blocks are required to work out equation (8) as $\underline{c}_p$ runs commonly north-south through processor blocks. This is worked out first, so that the denominator d of equation (10) may be ready as the processor blocks pass out the partial $Q_{new} \underline{c}_p^T$ sums. Equation 9 is worked out and stored entirely internally in the processor blocks. All signals in the figures are preceded by their full instantiated names, for example, the signal r_valid appears as '/proc_test2_tb_v/uut/r_valid'.

Figure 12A:
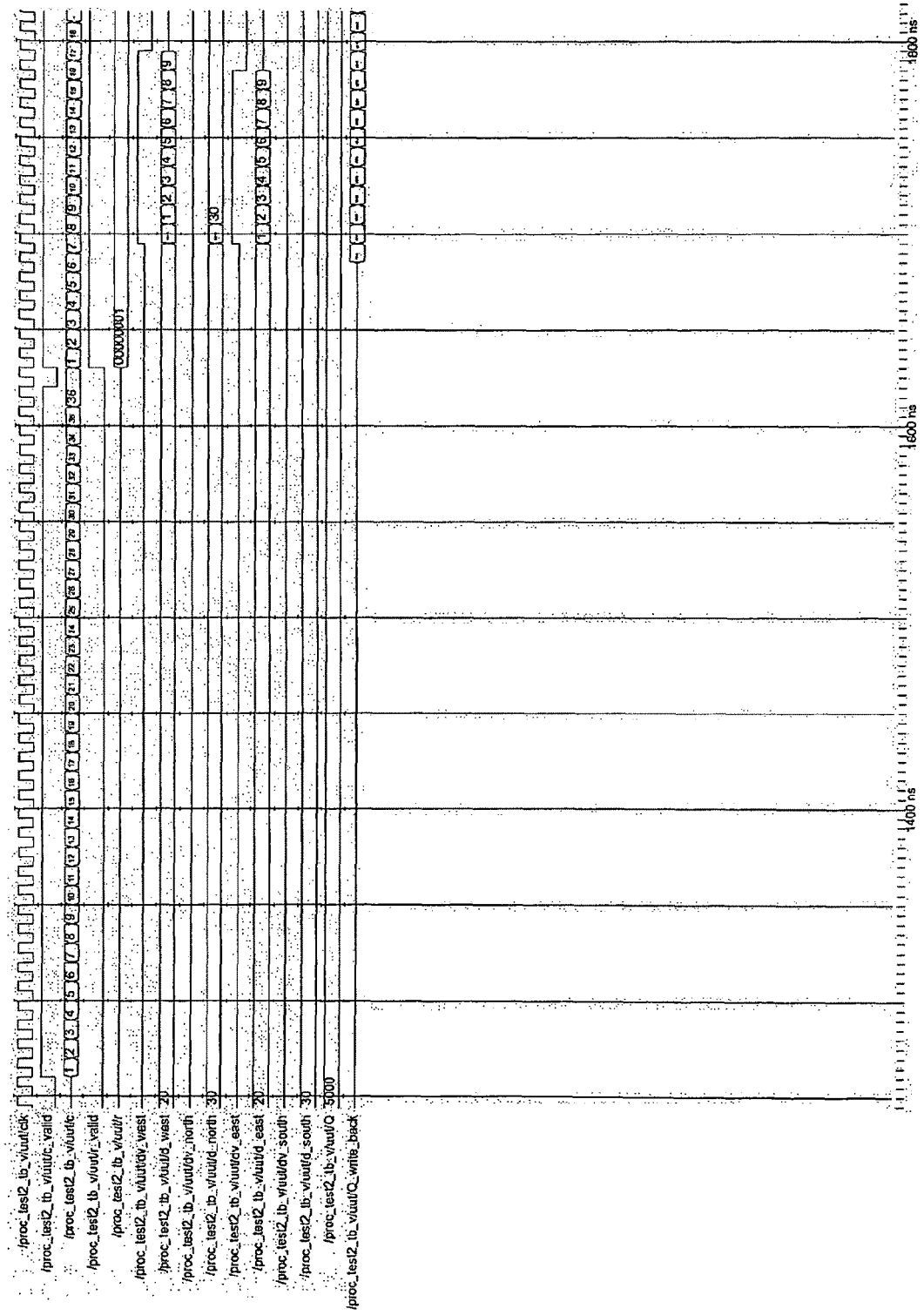
FIGS. 12a to 12f show processor block timing diagrams illustrating the operation of a preferred embodiment of the system.

The timing diagram in FIG. 12a shows data being passed in to the top, left-most block (i.e. the most northerly, westerly block), for equation (8). It receives 36 values of c when the signal c_valid is asserted. The bus signal r need not be defined (it is not required by equation 8). The resulting partial $\underline{c}_p \cdot \underline{c}_p$ sums of the top processor blocks are placed in a register in the processor block, and then passed in a westerly direction through d_east to d_west; to be accumulated by the appropriate math block. (The signals dv_east indicates valid data coming in to the processor block from the east, and dv_west indicates valid data coming out of the processor block to the west).

Figure 12B:
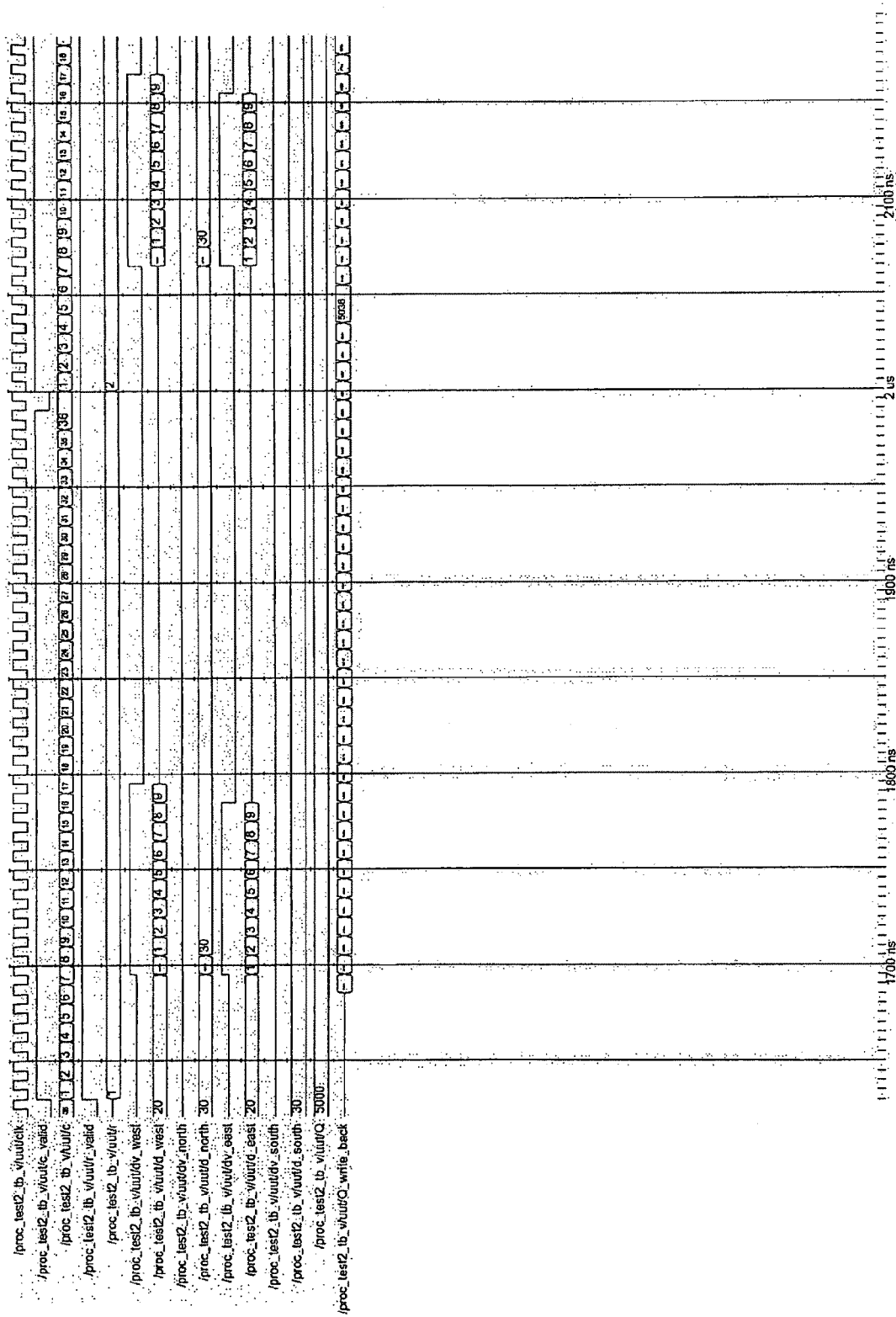
Figure 12C:
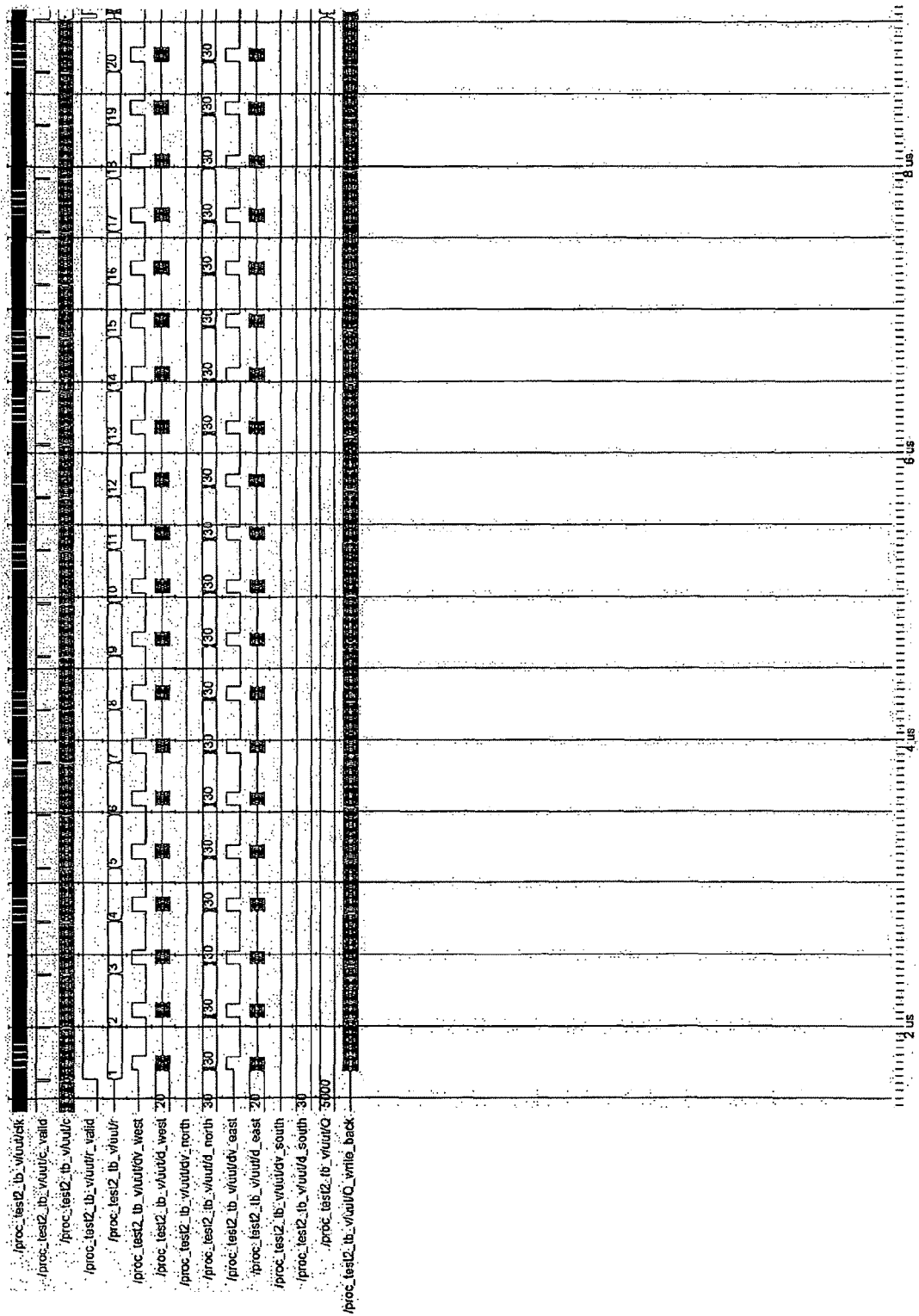

FIGS. 12b and 12c show the timing of data supplied in order to work out equations 9 and 10. In particular FIG. 12b shows a timing diagram for first two row values being passed to the top, left-most block, and FIG. 12c shows a timing diagram for all data being passed to the top, left-most block. Again the partial sums are passed (after each supply of row and column data, and during the supply of the next row and column data valued) from east to west to be accumulated by the math block, and hence stored in the row memory ready for the second half of the algorithm.

We now describe evaluation of the second half of the algorithm.

The second half of the algorithm evaluates first:

$$d = \underline{r}_p^T \underline{r}_p \quad (11)$$

and then, simultaneously:

$$\underline{c}_{p\ new} = \frac{k_n + \underline{r}_p^T Q_{new}}{k_d + d} \quad (12)$$

$$Q'_{new} = Q_{new} + \underline{r}_p \cdot \underline{c}_{p\ new} \quad (13)$$

Figure 12D:
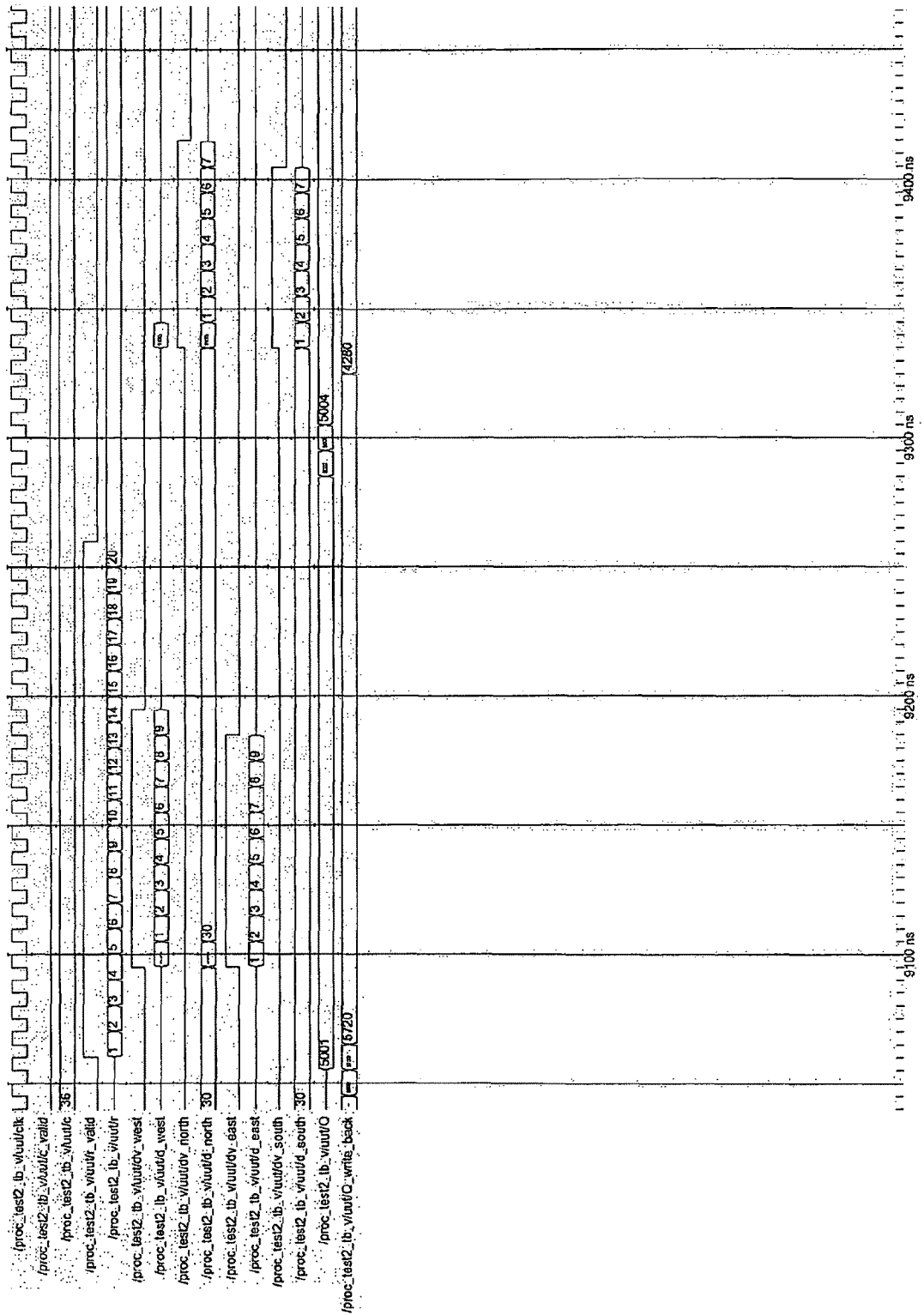

Because equation 13 requires $\underline{c}_{p\ new}$ (which takes time to evaluate—equation 12 must be worked out first), the processor blocks cannot work the equations out simultaneously without delaying $Q_{new}$ internally. FIG. 12d shows a timing diagram for all data being passed to the top, left-most block, to work out equation 4. The partial sums of the block are passed from south to north.

Figure 12E:
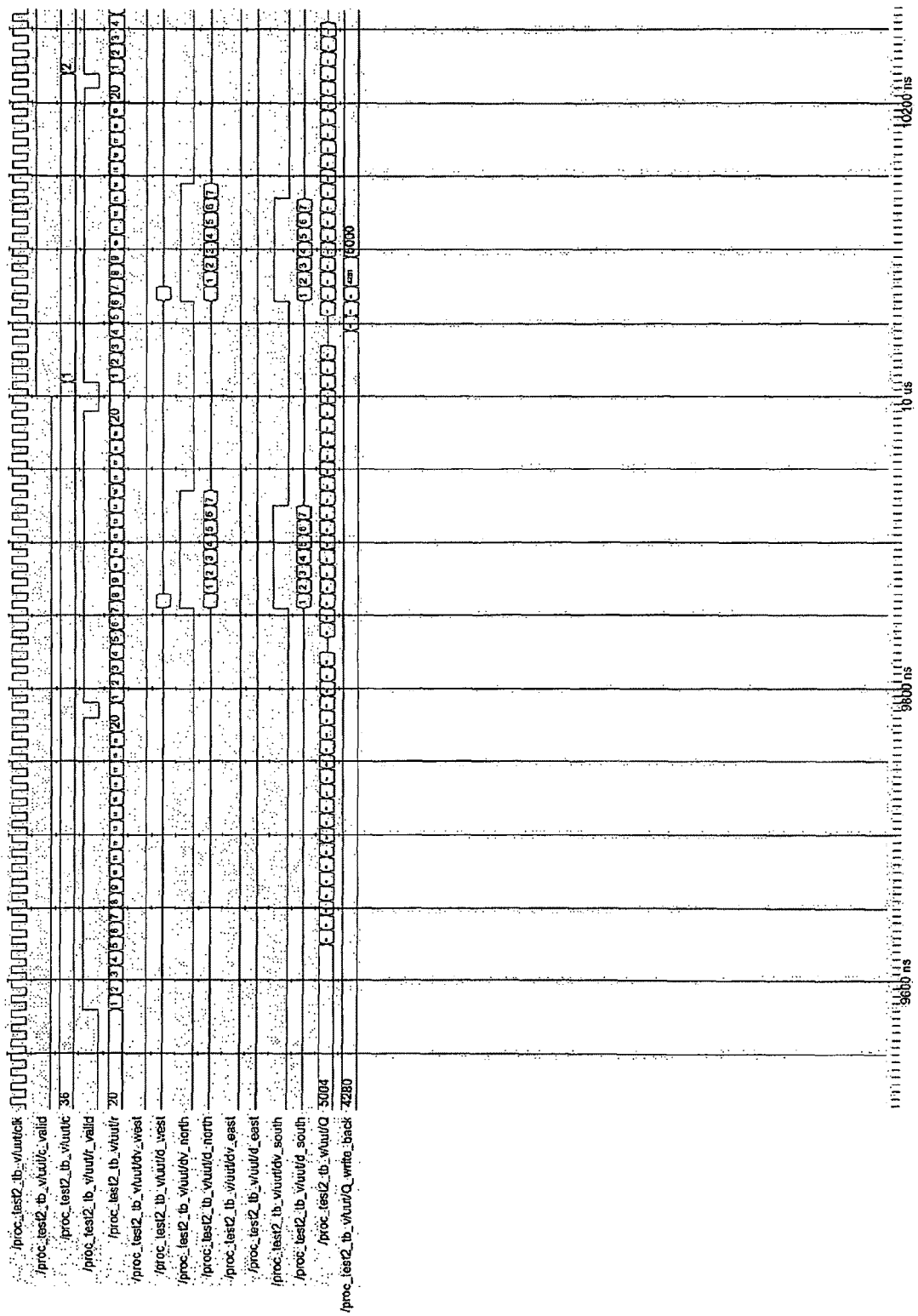

After $\underline{r}_p \cdot \underline{r}_p$ is evaluated, then the first values of $\underline{c}_{p\ new}$ are worked out. In order to avoid stalling after each r_valid pulse (a stall would be required for the multiplier latencies to work out $\underline{c}_{p\ new}$), equation 12 is advanced by one r_valid pulse compared to equation 13; and Q is buffered internally in the processor blocks by 2×R_BLOCK_SIZE=40 (so that the correct values $\underline{r}_p$ are multiplied with the correct values of Q). This is shown in FIG. 12e, which shows a timing diagram for all data being passed to the top, left-most block, for equation 12.

Figure 12F:
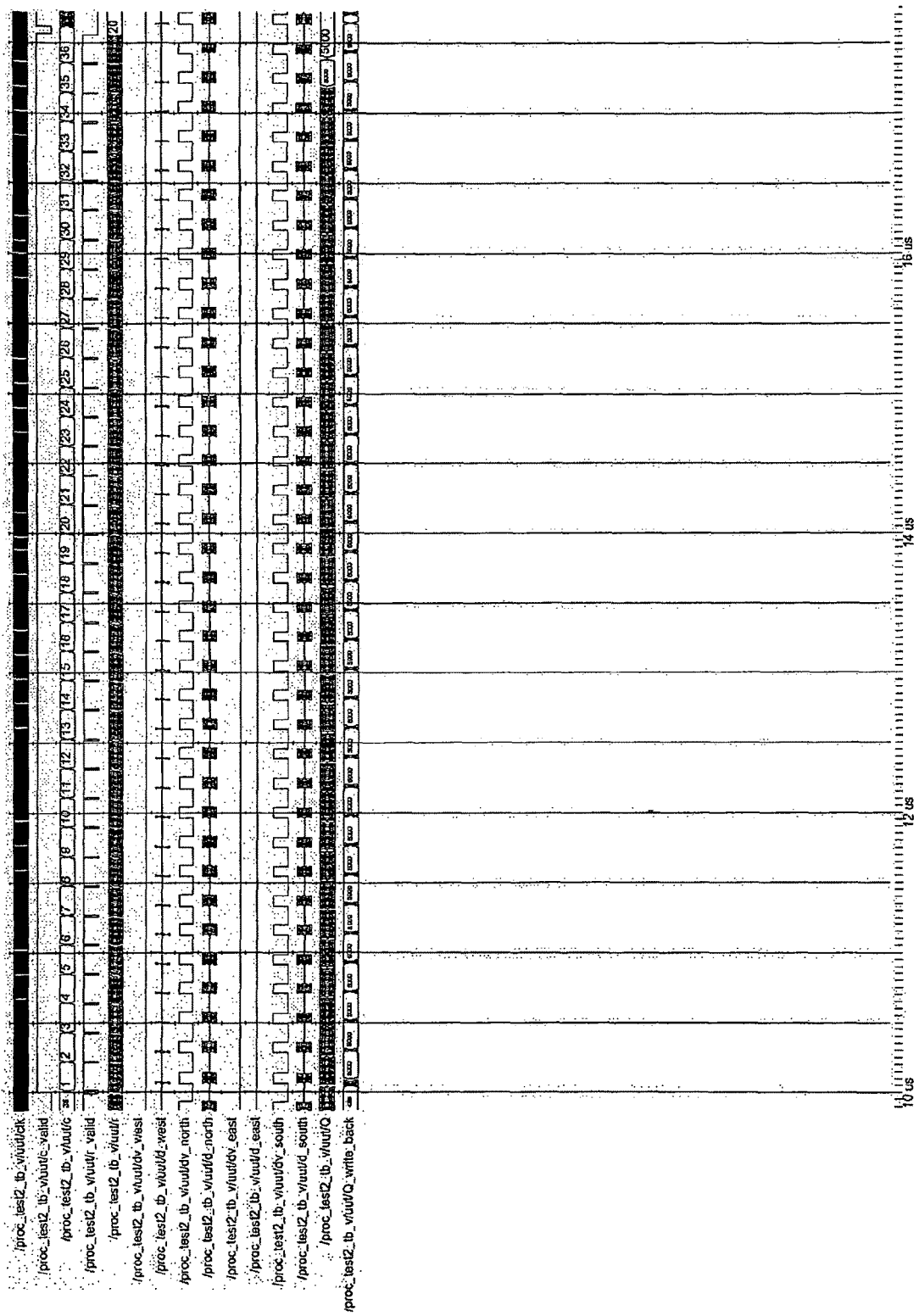

FIG. 12f shows a timing diagram for all data being passed to the top, left-most block as equations 12 and 13 are worked out simultaneously. The partial $\underline{c}_{p\ new}$ sums are passed from south to north to the column accumulator blocks, where $\underline{c}_{p\ new}$ is evaluated and stored in the column memory, ready for the next iteration.

Optionally but preferably the hardware may also include an input data pre-processor. This may implement one or more of the following functions: a decoder for 4:2:2 luminance-chrominance data, a colour space converter (which may incorporate a matrix multiplier to calculate R', G', B' as described above), and, for interlaced video, a module to perform an averaging function (over 2 lines, 4 pixels in x-direction, that is a 2×4 array).

Embodiments of the above described techniques provide image data processing which makes possible passive matrix TV-sized screens (say 8" and above) with only slightly higher power consumption, and vastly lower cost, than active matrix equivalents. The hardware accelerator can also be used for wide variety of other applications, as mentioned in the introduction. Thus in embodiments the data exists in a number of sets, and the target comprises data from each set on one or more axes, and properties of the data (for example a set of types, classification or reduced parameter analysis) on another axis. In embodiments the properties are additive so that a sum of a component or property across multiple sets is meaningful. These techniques may be employed to process image data for face and other image matching/recognition, for network security—for example for processing a semantic representation of a user's profile constructed, say, by content—based text filtering, for processing multivariate data in a database to provide a reduced representation of the input data, for many different sorts of sensor data processing, for example to perform principle component analysis, for processing, analysing or component analysis of microarray data or biological sequence data such as gene, proteome, nucleotide, or amino acid sequence data, say to find localised features in expression space or to identify binding or interaction sites, for machine learning, for example for analysing data describing objects or parts of objects, images, sounds, text, or words and the like, and generally for data analysis and pattern recognition.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A matrix factorisation hardware accelerator for determining a pair of factor matrices (R; C) which when multiplied together approximate a target matrix, the hardware accelerator comprising:
   an input to receive an input data matrix representing said target matrix;
   a first factor matrix memory for storing row and column data for a first factor matrix (R), said first factor matrix memory having a plurality of first data buses each associated with a respective block of said first factor matrix memory for accessing first factor matrix column data stored in the block;
   a second factor matrix memory for storing row and column data for a second factor matrix (C), said second factor matrix memory having a plurality of second data buses each associated with a respective block of said second factor matrix memory for accessing second factor matrix row data stored in the block;
   a matrix of processor blocks, each processor block having: a first processor block data bus coupled to one of said first data buses, a second processor block data bus coupled to one of said second data buses, and a result data output; a processor memory block for storing a portion of a matrix (Q) representing a difference between a product of said pair of factor matrices and said target matrix; and a data processor comprising at least one multiply-add unit, wherein said multiply-add unit comprises a multiplier coupled to an adder, said data processor having a first input coupled to said processor memory block and a second input coupled to one or both of said first and second processor block data buses and having an output coupled to said result data output; and control circuitry to control writing of data from said input into said processor memory blocks of said matrix of processor blocks, to control reading of data from said first and second factor matrix memories for provision to said matrix of processor blocks, and to control writing of data derived from said result data outputs back to said first and second factor matrix memories to perform said matrix factorisation, wherein the matrix factorisation comprises Non-Negative Matrix Factorisation.

2. A matrix factorisation hardware accelerator as claimed in claim 1 wherein each said processor block has a third processor block data bus coupled to said processor memory block, and wherein said processor memory block is configured to store a portion of said matrix (Q) having a first dimension corresponding to a number of row data items of said first factor memory column data accessed by a said first data bus and having a second dimension corresponding to a number of column data items of said second factor memory row data accessed by a said second data bus.

3. A matrix factorisation hardware accelerator as claimed in claim 2 wherein a said processor block has a pair of said third processor block data buses for writing data into and reading data from said processor memory block respectively, and wherein said processor blocks are daisy-chained by said third processor block data buses.

4. A matrix factorisation hardware accelerator as claimed in claim 1, wherein a said processor block has two said result data outputs and two result data inputs; and wherein said matrix of processor blocks comprises a rectangular matrix of processor blocks daisy-chained in two directions by said result data inputs and outputs.

5. A matrix factorisation hardware accelerator as claimed in claim 1 further comprising first and second math blocks associated with said first and second factor matrix memories to accumulate data received from said matrix of processor blocks for writing back to said respective first and second factor matrix memories.

6. A matrix factorisation hardware accelerator as claimed in claim 5 wherein each of said first and second math blocks comprises a master math block and one or more slave math blocks, and wherein said master math block includes a divider unit having an output to said one more slave blocks and wherein each of said one or more slave blocks includes a multiplier unit having an input coupled to said divider unit output.

7. A matrix factorisation hardware accelerator as claimed in claim 5 wherein said first and second factor matrix memories comprise dual-ported memory to allow simultaneous read access for said processor blocks and write access by said math blocks.

8. A matrix factorisation hardware accelerator as claimed in claim 1 wherein said processor blocks comprise a master processor block and a plurality of slave processor blocks, and wherein said master block is configured to control, in said slave processor blocks, one or both of an address of said processor block memory and operation of said data processors in said slave processor blocks.

9. A matrix factorisation hardware accelerator as claimed in claim 1 wherein said multiply-add unit has first and second multiply inputs coupled to said first and second processor block data buses, an add input coupled to a read output of said processor memory block and an output coupled to a write input of said processor memory block, and wherein said data processor further comprises a multiply-add unit configured as a multiply-accumulate unit having a first multiply input coupled to said multiply-add output and a second-multiply input selectably couplable to one of said first and second processor block data buses, and having an output coupled to said data processor output.

10. A matrix factorisation hardware accelerator as claimed in claim 1 wherein said processor memory block includes a buffer for storing a copy of said portion of said stored matrix (Q), and wherein said data processor is simultaneously operable with two different versions of said stored matrix portion.

11. A matrix factorisation hardware accelerator as claimed in claim 1 wherein said data processor is configured to use integer arithmetic with variables of a first bit length, and wherein said processor memory block is configured to store integer variables of twice said first bit length.

12. A matrix factorisation hardware accelerator as claimed in claim 1 wherein said data processor is configurable to perform the following operations for data corresponding to said stored matrix (Q) portion:

$$Q_{xy} = Q_{xy} + R_{py}C_{xy};$$

$$\sum_x C_{xp}C_{xp};$$

$$\sum_x Q_{xy}C_{xy};$$

$$\sum_y R_{py}R_{py};$$

$$\sum_y Q_{xy}R_{py};$$

$$Q_{xy} = Q_{xy} - R_{py}C_{xp}$$

where xy, py and xp label columns and rows of Q, R and C respectively.

13. An integrated circuit comprising the matrix factorisation hardware accelerator of claim 1.

14. An OLED display driver including the matrix factorisation hardware accelerator of claim 1.

15. A method of hardware accelerating a non-negative matrix factorisation (NMF) calculation using a matrix factorisation hardware accelerator as claimed in claim 1, the calculation comprising iteratively determining:

$$Q_{xy} = Q_{xy} + R_{py}C_{xp} \text{ for each } x \text{ and } y \quad (1)$$

$$R_{py} = \frac{\text{bias} + \sum_x Q_{xy}C_{xp}W_{xyp}}{\text{bias} + \sum_x C_{xp}C_{xp}W_{xyp}} \text{ for each } y \quad (2)$$

$$C_{xp} = \frac{\text{bias} + \sum_y Q_{xy}R_{py}W_{xyp}}{\text{bias} + \sum_y R_{py}R_{py}W_{xyp}} \text{ for each } x \quad (3)$$

$$Q_{xy} = Q_{xy} - R_{py}C_{xp} \text{ for each } x \text{ and } y \quad (4)$$

where equations (1) to (4) are evaluated for each value of p each iteration, and where $W_{x,p}$ comprises a weighting factor, the method comprising, for each p:

storing Q in a plurality of memory blocks distributed across a corresponding plurality of processor blocks;

evaluating the denominator of equation (2);

evaluating contributions to the numerator of equation (2) and equation (1)

substantially simultaneously across said plurality of processor blocks to determine $Q_{xy}$ and $R_{py}$;
evaluating the denominator of equation (3); and
evaluating contributions to the numerator of equation (3) and equation (4) substantially simultaneously across said plurality of processor blocks to determine $C_{xp}$ and $Q_{xy}$.

16. A non-transitory carrier carrying processor control code that, when executed by a processor, performs the method of claim 15.

17. A system for hardware accelerating a non-negative matrix factorisation (NMF) calculation using a matrix factorisation hardware accelerator as claimed in claim 1, the calculation comprising iteratively determining:

$$Q_{xy} = Q_{xy} + R_{py}C_{xp} \text{ for each } x \text{ and } y \quad (1)$$

$$R_{py} = \frac{\text{bias} + \sum_{x} Q_{xy}C_{xp}W_{xyp}}{\text{bias} + \sum_{x} C_{xp}C_{xp}W_{xyp}} \text{ for each } y \quad (2)$$

$$C_{xp} = \frac{\text{bias} + \sum_{y} Q_{xy}R_{py}W_{xyp}}{\text{bias} + \sum_{y} R_{py}R_{py}W_{xyp}} \text{ for each } x \quad (3)$$

$$Q_{xy} = Q_{xy} - R_{py}C_{xp} \text{ for each } x \text{ and } y \quad (4)$$

where equations (1) to (4) are evaluated for each value of p each iteration, and where W comprises a weighting factor, the system comprising:
means for storing Q in a plurality of memory blocks distributed across a corresponding plurality of processor blocks;
means for evaluating the denominator of equation (2);
means for evaluating contributions to the numerator of equation (2) and equation (1);
means for evaluating the denominator of equation (3); and
means for evaluating contributions to the numerator of equation (3) and equation (4) substantially simultaneously across said plurality of processor blocks to determine $C_{xp}$ and $Q_{xy}$.

18. A display driver or display including the system of claim 17.

19. An integrated circuit (IC) for matrix factorisation, wherein
the matrix factorisation comprises Non-Negative Matrix Factorisation, the IC comprising:
an input to receive an input data matrix representing a target matrix for factorisation into first and second factor matrices (R; C);
a plurality of first data buses each for accessing stored data in a block of first factor matrix memory (R);
a plurality of second data buses each for accessing stored data in a block of second factor matrix memory (C); and
a matrix of processor blocks, each processor block having:
a first processor block data bus coupled to one of said first data buses, a second processor block data bus coupled to one of said second data buses, and a result data output; a processor memory block for storing a portion of a matrix (Q) representing a difference between a product of said pair of factor matrices and said target matrix; and a data processor comprising at least one multiply-add unit, where said multiply-add unit comprises a multiplier coupled to an adder, said data processor having a first input coupled to said processor memory block and a second input coupled to one or both of said first and second processor block data buses and having an output coupled to said result data output.

* * * * *